(12) United States Patent
Sandefur et al.

(10) Patent No.: US 10,780,593 B2
(45) Date of Patent: Sep. 22, 2020

(54) CUTTING APPARATUS

(71) Applicants: Terry Sandefur, Bayfield, CO (US); Charles A. Patterson, Durango, CO (US)

(72) Inventors: Terry Sandefur, Bayfield, CO (US); Charles A. Patterson, Durango, CO (US)

(*) Notice: Subject to any disclaimer, the term of this patent is extended or adjusted under 35 U.S.C. 154(b) by 0 days.

(21) Appl. No.: 16/571,100

(22) Filed: Sep. 14, 2019

(65) Prior Publication Data

US 2020/0030999 A1  Jan. 30, 2020

Related U.S. Application Data

(60) Division of application No. 16/035,624, filed on Jul. 14, 2018, now Pat. No. 10,449,680, which is a continuation-in-part of application No. 15/706,737, filed on Sep. 17, 2017, now Pat. No. 10,046,468, which is a division of application No. 14/681,072, filed on Apr. 7, 2015, now Pat. No. 9,796,099.

(60) Provisional application No. 61/976,503, filed on Apr. 8, 2014.

(51) Int. Cl.
  *B26B 15/00* (2006.01)
  *B26B 19/06* (2006.01)
  *A01G 3/037* (2006.01)

(52) U.S. Cl.
  CPC .............. *B26B 15/00* (2013.01); *A01G 3/037* (2013.01); *B26B 19/06* (2013.01)

(58) Field of Classification Search
  CPC ......... B26B 15/00; B26B 19/06; A01G 3/039; A01G 3/08; A01G 3/033; H01H 19/62; H01H 9/06; H02K 7/145; F02B 2075/025
  USPC ...... 30/210, 228, 180, 192, 247; 310/50, 47; 318/346, 443, 466
  See application file for complete search history.

(56) References Cited

U.S. PATENT DOCUMENTS

| | | | | |
|---|---|---|---|---|
| 2,055,129 A | * | 9/1936 | Hill | B26B 19/148 30/29.5 |
| 2,490,086 A | * | 12/1949 | Page | B26B 15/00 30/228 |
| 3,039,189 A | * | 6/1962 | McBerty | A01G 3/033 30/245 |
| 3,798,768 A | * | 3/1974 | Cowley | A01G 3/053 30/223 |
| 4,651,761 A | * | 3/1987 | Suen | B26B 19/20 132/148 |
| 4,979,303 A | * | 12/1990 | Han | B26B 19/06 30/210 |

(Continued)

*Primary Examiner* — Ghassem Alie
(74) *Attorney, Agent, or Firm* — Roger A. Jackson

(57) ABSTRACT

A cutting apparatus for trimming an article, the apparatus has a manually grasped power element with a reciprocating arm having a removably engagable rotatable couple including a selectable rotational index position lock. Also included is a cutting head assembly that is removable and rotationally indexable relative to the power element, the cutting head having a pair of reciprocating cutting blades for trimming the article. Wherein operationally, the reciprocating arm drives the cutting blades that have reciprocating movement with the cutting head selectably rotatable to the power element, user wrist fatigue is reduced, also with the cutting head being removable from the power element, the cutting head assembly is easier to clean.

9 Claims, 15 Drawing Sheets

(56) References Cited

U.S. PATENT DOCUMENTS

| | | | | |
|---|---|---|---|---|
| 5,067,375 A | * | 11/1991 | Wolter | H02G 1/1212 |
| | | | | 81/9.42 |
| 5,426,856 A | * | 6/1995 | Aiyama | A01G 3/053 |
| | | | | 30/208 |
| 6,973,727 B2 | * | 12/2005 | Yao | A01G 3/037 |
| | | | | 30/228 |
| 7,100,373 B2 | * | 9/2006 | Oide | B23D 15/14 |
| | | | | 30/228 |
| 2013/0247384 A1 | * | 9/2013 | Ishiguro | A01G 3/08 |
| | | | | 30/228 |

* cited by examiner

CUTTING APPARATUS

RELATED PATENT APPLICATIONS

This application is a divisional of United States continuation in part (CIP) patent application Ser. No. 16/035,624 filed on Jul. 14, 2018 by Terry Sandefur of Bayfield, Colo., U.S. and Charles A. Patterson of Durango, Colo., U.S., of U.S. divisional patent application Ser. No. 15/706,737 filed on Sep. 17, 2017 by Terry Sandefur of Bayfield, Colo., U.S. that is a divisional of U.S. patent application Ser. No. 14/681,072 filed on Apr. 7, 2015 by Terry Sandefur of Bayfield, Colo., U.S. that claims the benefit of U.S. provisional patent application Ser. No. 61/976,503 filed on Apr. 8, 2014 by Terry Sandefur of Bayfield, Colo., U.S.

TECHNICAL FIELD

The present invention relates generally to a cutting apparatus that is hand held for the purpose of trimming off selected parts of an article. More particularly, the present invention of the cutting apparatus has powered cutting blades that are axially pivotable about a cutting head for hand held comfort and the cutting blades are removable for cleaning stemming from article contamination of the cutting blades.

BACKGROUND OF INVENTION

Trimming an article can be a tedious and boring process, especially when a high number of repetitive cuts need to be made, even with the use of a powered cutter, the constant re-positioning of the powered cutter can lead to operator hand and wrist fatigue in having issues similar to the well-known carpal-tunnel syndrome from a high number of repetitive hand and wrist motions. Another issue can be the oil or tar resin present in the article that can gum up the cutting blades of the cutting apparatus, requiring frequent blade cleaning. Most cutting apparatus are designed for general use in that they can be applied to a number of different cutting uses, from fabric, to sheet steel, to wire mesh, to plant and tree pruning, to paper, to hair, to cardboard, to wood sheeting, and so on. Each one of these cutting apparatus uses ideally has specialized cutting blades, i.e. sharpness, clearance, blade cutting pattern, material of the cutting blade, speed of the cutting blades coming together, the force of the blades coming together, the angle that the blades come together, how tightly clamped the blades are to one another at their mutual pivot point, and so on.

However, there are additional issues with the cutting apparatus outside of the cutting blade specifics described above that concern user or operator fatigue, as most cutting apparatus tasks are limited in the amount of time or the amount of cutting that is done, i.e. cutting fabric for a single sewing project, this issue of operator fatigue is typically not addressed. This is mostly due to the fact that when a large amount of cutting is required, such as the mass production of clothing in manufacturing thus requiring many thousands of clothing items with the required fabric cutting being done on a large scale would be partially or totally automated, not only to save time, but to ensure constant repetitive quality in the fabric cutting. Thus, when the cutting situation arises wherein one would have the need to do fairly high volumes of repetitive cutting, however, not enough cutting volume to justify automation, the problem arises of operator fatigue is using for instance a handheld cutting apparatus and doing a high number of repetitive cutting motions.

This leads to the need for design modifications to reduce operator fatigue in using the handheld cutting apparatus for highly repetitive cutting motions, these design modifications would include ways to minimize fixed hand and wrist positioning, i.e. facilitating a variety of different hand and wrist motions for accomplishing the same cutting function. Further, structure to make separable blade cleaning easy, as this is mostly an issue with the article to be trimmed is of an organic nature and can leave a residue on the cutting blade during use that can act to impair the cutting blades efficiency and increase friction as between the blades, thus overloading the drive motor.

In looking at the prior art in U.S. Pat. No. 3,631,596 to Glaus, disclosed is an electric scissors assembly having a stationary blade and an independently oscillating blade driven by a motor, all mechanical and electrical parts, particularly the scissors, motor and battery being accommodated and mounted in a handle-shaped casing made of two assembled parts of plastic material without any screw-fastened portions by means of elastic portions latched to the casing, and all of the mechanical and electrical parts being readily exchangeable. Glaus has a Teflon slider ring 10 that is inserted between the cutting blades to reduce friction thus reducing motor power required therethrough the eccentric motor drive 23, requiring minimal space, see FIGS. 2 and 3. In Glaus, the focus is upon the mechanism of the scissors having ease of assembly and disassembly, wherein the scissors cutting head and the motor/drive mechanism are a single assembly, as best shown in FIGS. 1 and 3. Glaus has no teaching relative to an axially pivoting scissors head that is independently removable.

Continuing in the prior art in United States Patent Application Number 2013/0247384 to Ishiguro, disclosed is an electric scissor that is provided with; a moving first blade, a moving second blade, a toggle link mechanism including a first link, a second link, and a drive shaft; and a drive section. In Ishiguro, one end of the first link is rotatably connected to a transmission portion of the first blade and one end of the second link is rotatably connected to a transmission portion of the second blade. Ishiguro has the other end of the first link rotatably connected to the other end of the second link through the drive shaft. The drive section in Ishiguro is configured to open/close the first blade and the second blade by displacing the drive shaft in a direction perpendicular to an axial direction of the drive shaft. The toggle link mechanism in Ishiguro has the advantage of increasing the mechanical advantage of the cutting blade to cutting blade closing force as the cutting blades are drawn closer together, thus according to Ishiguro added cutting force between the blades in created when it is needed most, being near the end of the cut, i.e. specifically for tree branch pruning. The drawback of the Ishiguro toggle link mechanism is in its size, requiring a significant amount movement space as shown in FIGS. 1, 2, 4, and 5. The increasing mechanical advantage of the toggle link can best be seen in going from FIG. 1 to FIG. 2, and the graph in FIG. 3. Ishiguro also has no teaching relative to an axially pivoting scissors head that is independently removable.

Further, in the prior art in U.S. Pat. No. 3,693,254 to Salonen disclosed is a portable, hand-held shearing implement, which includes a pair of cutting blades employing a motor powered mechanism to apply the cutting force, Salonen having a similar toggle link blade cutting mechanism to Ishiguro thus providing for increased mechanical advantage in proportion to the closing of the blades together. The invention in Salonen is particularly adaptable for an implement to execute individual, deliberate, cutting strokes, i.e. such that a single "cut" can be selectably executing such that the cutting blades are just moved together a single time as desired, this is as opposed to most powered cutting blades that of necessity continuously move together and apart from one another, wherein a single selectable blade cut cannot be executed.

One version in Salonen may be powered by an electric motor or a self-contained internal combustion engine, driving through a gear reduction train to a reciprocatory mechanism having threaded means with a releasable coupling to drive the power stroke. Another version in Salonen employs a controllable reversing switch to effect the reciprocative action and is limited to an electric motor drive. In the former version of Salonen, reopening of the blades is spring actuated with provision included to soften the impact of termination, and includes a triggering means to stop and hold the reciprocative action after each cycle until released by trigger actuation. Also Salonen also has no teaching relative to an axially pivoting scissors head that is independently removable.

Moving onward in the prior art in United States Patent Application Number 2013/0000130 to Maniwa disclosed are electric scissors, a rotating motion of a motor is converted into a linear motion, and a link mechanism is operated to open and close blades by the linear motion, again wherein the closing force is increased when the blades are moved toward one another, similar to Ishiguro and Salonen. The electric scissors in Maniwa include a current control unit that controls an electric current value to the motor, and a detection unit that detects that an angle between the blades becomes a predetermined angle.

The current control unit in Maniwa changes an upper limit of the electric current value to be supplied to the motor when the detection unit detects that the angle between the blades becomes the predetermined angle, thus resulting in blade closing force control via motor current control and not having to have excessively strong linkage and blade components that would be required otherwise similar to the linkage action of bolt cutters that must withstand very high near blade closing cutting forces. Further, Maniwa also has no teaching relative to an axially pivoting scissors head that is independently removable.

Continuing, in the prior art in U.S. Pat. No. 3,787,742 to Murphy disclosed is an electric shear assembly in which there is provided a housing having swingably interconnected first and second cutting blades mounted therein and projecting outwardly therefrom. In Murphy, a gear train is mounted within the housing and is interconnected between a reversible electric motor and a second blade for moving the second blade with respect to said first blade, i.e. such that only the second blade is moving. Also in Murphy a manually manipulatable switch assembly is mounted on the housing and is coupled through a second switch assembly for actuating the motor to drive the gear train in a first direction to cause the cutting blades to open and close.

Further in Murphy a cam driven by the gear train is engagable with the second switch assembly for selectively opening and closing the assembly to control the motor to drive the gear train in a second direction for an interval sufficient to position the cutting blades in an open position and deactuate said motor. In Murphy a cam type arrangement is used to transmit motor rotational action to closing pivotal movement of the blade, requiring a motor to be reversible to go from blade closing movement to blade opening movement, wherein the blade closing movement for instance can be selectively stopped at any point to help prevent a finger injury from the closing blade, and by having a slow moving cutting stroke. Also, Murphy also has no teaching relative to an axially pivoting scissors head that is independently removable.

What is needed is a cutting apparatus that can accommodate on a functional output basis a high number of similar cutting tasks, however, without imparting excessive fatigue upon the operator of the cutting apparatus. Thus would be accomplished by de-coupling or buffering the functional end task of the cutting blades from the hand and wrist movement required of the cutting apparatus operator through variable structure to alter positional orientations as between the cutting blades and the operator's hand and wrist. Further desired would be structure to allow easy cleaning of the cutting blades to be able to keep them at their optimum cutting efficiency.

SUMMARY OF INVENTION

Broadly, the present invention is a cutting apparatus for trimming a selected portion from an article, the cutting apparatus including a power element that has a first end portion and an opposing second end portion with a longitudinal axis spanning therebetween. Wherein the first end portion has a reciprocating arm with a reciprocating movement and the second end portion is adapted to be grasped by a manual user's hand. The reciprocating arm having a first removably engagable rotatable couple with an annulus that is about the longitudinal axis and the first end portion having a first removably engagable interface structure. Further included in the cutting apparatus is a removable coupling having a primary end portion and an opposing secondary end portion with a lengthwise axis spanning therebetween, the primary end portion has a removably engagable rotatable couple second interface and the secondary end portion having a first slotted pivotal aperture.

Wherein the coupling transmits the reciprocating arm movement, also positionally the lengthwise axis and the longitudinal axis are coincident to one another. Further included is a removable cutting head assembly having a proximal end portion and an opposing distal end portion with a long axis spanning therebetween. The proximal end portion includes a fourth removable engagable interface structure that removably engages with the first removable engagable structure, the distal end portion having a pair of cutting blades that each have a free end portion and an opposing linkage first pivotal connection with a mid-blade section therebetween. The mid-blade portions have the first pivotal connection to one another, wherein the first pivotal connection has a first pivotal axis, the cutting blade free end portions having a scissor type movement in a first plane.

Wherein the first pivotal connection is attached to the cutting head assembly distal end portion through a rotatable pivot head, the pair of intermediate linkages each have a second pivotal connection, the pair of intermediate linkages are also pivotally attached to a third pivotal connection of the removable coupling first slotted pivotal aperture.

Operationally, the reciprocating arm drives through the removable coupling to the pair of intermediate linkages and the cutting blades such that the cutting blade free end portions have the scissor movement from the first pivotal connection to the cutting blade free ends that are functional to cut the article. Further the cutting head assembly is selectably rotatable in a circular movement in an indexable rotationally locked manner about the longitudinal axis. Thus allowing the first, second, and third pivotable axes to rotate about the longitudinal axis allowing the scissor type movement in the first plane to be selectively rotatable about the longitudinal axis, further the cutting head assembly and the coupling are removably engagable from the power element for cleaning.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 3 shows a side elevation cross section from FIG. 1, giving detail of the straight power element along the longitudinal axis, wherein FIG. 3 shows detail of the power element with the reciprocating arm having reciprocating movement as driven by the electric drive motor, the rotational axis of the motor, the cam drive element, the reciprocating arm that is slidably engaged to the bushing guide, and the first removably engagable interface structure;

REFERENCE NUMBERS IN DRAWINGS

Figure 1:
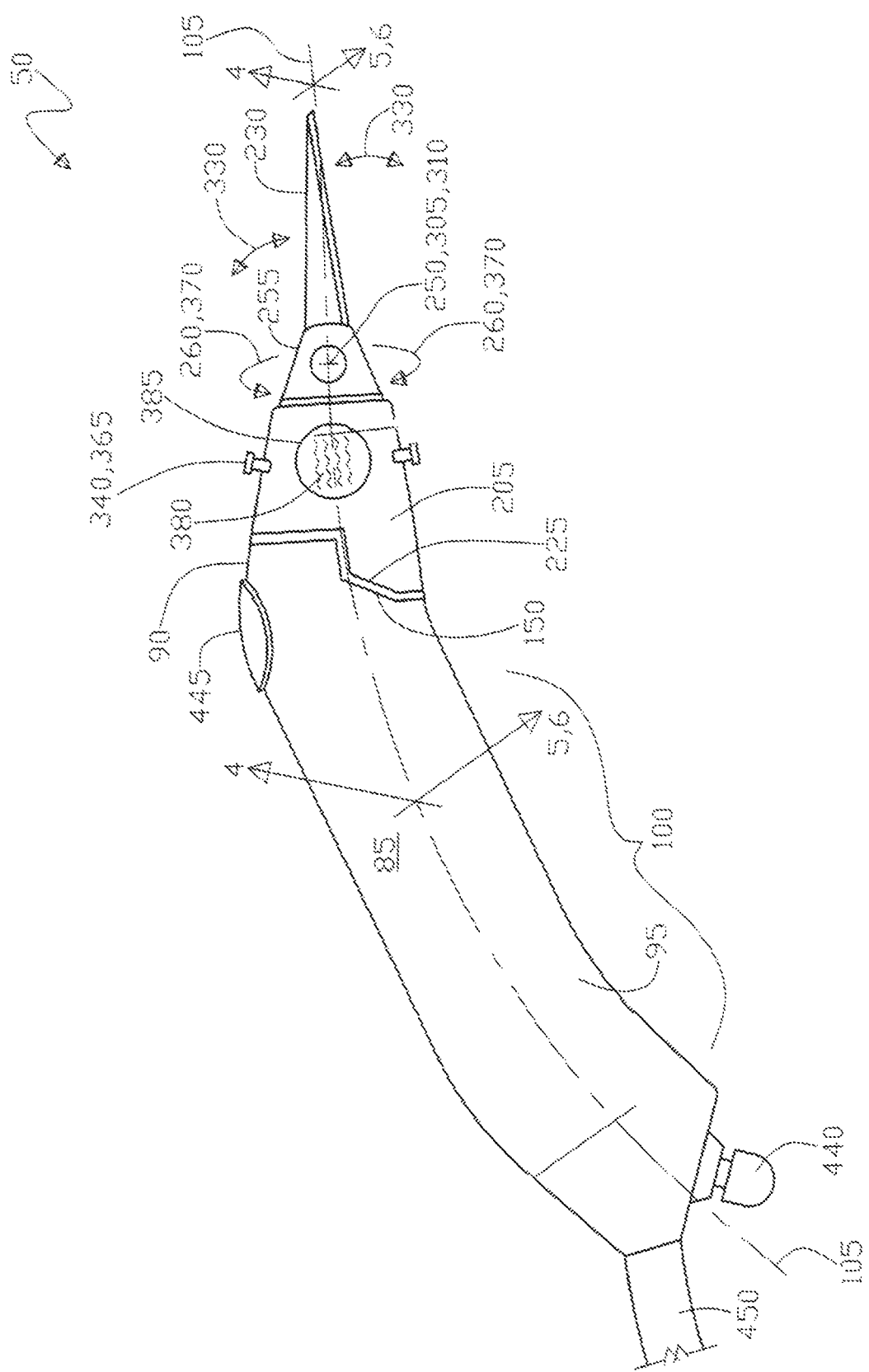
FIG. 1 shows a perspective view of the cutting apparatus that includes a power element, a first end portion of the power element, a second end portion of the power element, a portion of the power element adapted to be grasped by a user's hand, a longitudinal axis of the power element with a first removably engagement structure that is interfaced with a fourth removably engagable interface structure of a removable cutting head assembly that has a rotatable pivot head, plus a means for selectable rotationally locking a circular movement of the rotatable pivot head, also shown are the cutting blades, and the light beam with the third aperture.

50 Cutting apparatus
55 Manual user of the cutting apparatus 50
60 Hand of the user 55
65 Wrist of the user 55
70 Article
75 Trimming the article 70
80 Selected portion of the article 70 to be trimmed 75
85 Power element
86 Power element being straight along longitudinal axis 105
87 Power element curved along longitudinal axis 105
88 Housing of power element 86
89 Housing of power element 87
90 First end portion of the power element 85
91 Rotation stop surface of housing 89
95 Second end portion of the power element 85
100 Adapting to be grasped by the user's hand 60 of the second end portion 95
105 Longitudinal axis of the power element 85
110 Reciprocating arm of the power element 85
111 Reciprocating arm of the power element 85
115 Annulus of the reciprocating arm 110
120 Cantilever section of the reciprocating arm 110
121 Cantilever section of the reciprocating arm 111
125 Opposing end portion of the cantilever section 120 of the reciprocating arm 110
130 Bushing guide affixed to the second end portion 95
135 Slidable engagement of the reciprocating arm 110, 111 to the bushing guide 130 to maintain reciprocating movement 140
140 Movement of the reciprocating arm 110, 111 to transmit axial force
145 First removably engagable rotatable couple of the cantilever section 120
150 First removably engagable interface structure
155 Removable coupling
160 Primary end portion of the coupling 155
165 Secondary end portion of the coupling 155
170 Lengthwise axis on the coupling 155
175 Second interface of the removable coupling 155 that is removably engagable rotationally free about the longitudinal axis 105 of the coupling 155
180 T-slot positioned perpendicular to the lengthwise axis 170 of the second interface 175

185 Single outward radially oriented opening of the second interface 175
190 First slotted pivotal aperture of the coupling 155
195 Transmission of the reciprocating axial force through movement 140 at the coupling 155
200 Coincident position of the lengthwise axis 170, the longitudinal axis 105, and the long axis 220 to one another
205 Removable cutting head assembly
210 Proximal end portion of the removable cutting head assembly 205
215 Distal end portion of the removable cutting head assembly 205
220 Long axis of the removable cutting head assembly 205
225 Fourth removably engagable interface structure
230 Pair of open cutting blades
235 Straight extension outward of the pair of open cutting blades 230
240 Arcuate extension outward of the pair of open cutting blades 230
245 Free end portion of the cutting blades 230
250 Pivotally attached portion of the cutting blades 230
255 Rotatable pivot head
260 Rotation of the pivot head 255
265 Third interface structure of the rotatable couple of the rotatable pivot head 255
270 Mid-blade section of the cutting blades 230
275 Second pivotal connection
280 Second pivotal axis of the second pivotal connection 275
285 Pair of intermediate linkages
290 Third pivotal connection
295 Third pivotal axis of the third pivotal connection 290
300 Loop structure for slidably engaging the removable coupling 155 to maintain the reciprocating movement 140
305 First pivotal connection
310 First pivotal axis of the first pivotal connection 305
315 First plane
320 Flat first plane
325 Arcuate first plane
330 Scissor type movement of the free end portion 245 of the cutting blades 230 in the first plane 315
335 Selectably cutting the article 70 with the scissors movement 330
340 Means for selectably rotationally locking the circular movement 370 in a plurality of angular positions
345 Flexible extension
350 Protrusion of the flexible extension 345
355 Second aperture
360 Frictional projection of the protrusion 350 therethrough the second aperture 355
365 Clamp of the protrusion 350 to the second aperture 355
370 Circular rotational movement of the first 310, second 280, and third 295 pivotal axes about the longitudinal axis 105
375 Light
380 Beam of light of the light 375
385 Third aperture
390 Electrical drive motor
395 Rotational axis of the electrical drive motor 390
400 Cam drive drum element for transmitting motor 390 rotation about rotational axis 395 to reciprocating motion 140 of arm 110
401 Barrel cam element
402 Barrel cam channel of the barrel cam 401
403 Cam drive channel of the cam drive element 400
405 Swivel drive rotational coupling of the electric drive motor 390 to the barrel cam element 401
410 Means for anti rotation about longitudinal axis 105 of the reciprocating arm 110
411 Receiving slot disposed in the power element 86 housing 88 for the means 410 that precludes rotation about longitudinal axis 105 of the reciprocating arm 110 while allowing reciprocating movement 140 of the arm 110
412 Means 410 is preferably a first pin 413 disposed therethrough the arm 110 with a first ball bearing 414 positioned external to the arm 110 that is received in slot 411
413 First pin
414 First ball bearing
415 Means to connect the motor 390 rotation about rotational axis 395 into reciprocating movement 140 of the arm 110 via the first ball bearing 414 riding in the channel 403
416 Second pin
420 Means for rotationally retaining the barrel cam 401 to the motor 390
425 Means for reciprocating arm 111 to ride within the channel 402 and against surface 91
430 Means 425 is preferably a third pin 431 disposed therethrough the arm 111 with a second ball bearing 432 for riding in the channel 402 and an oppositely disposed second ball bearing 432 for reciprocating against surface 91
431 Third pin
432 Second ball bearing
435 Fifth pivotal axis
440 Circuitry
445 Normally open switch
450 Substantially rigid electrical power cord sleeve
455 Reciprocating cutting blade
456 Reciprocating cutting blade movement
460 Transversely positioned reciprocating cutting teeth of the reciprocating cutting blade 455
465 Cantilever end portion of the reciprocating cutting blade 455
470 Slidably engaged portion of the reciprocating cutting blade 455
475 Static cutting blade
480 Transversely positioned static cutting teeth of the static cutting blade 475
485 Cantilever end portion of the static cutting blade 475
490 Retained portion of the static cutting blade 475 in the cap 525
495 Rotatable retainer head
500 Rotation of the rotatable retainer head 495 about the long axis 220
505 Third interface structure of the rotatable couple of the rotatable retainer head 495 to the distal end portion 215
510 Slidable engagement of the retainer head 495 and the reciprocating cutting blade 455
515 Sixth pivotal connection
520 Sixth pivotal axis
525 Cap
530 "U" shaped removably engagable pin
535 Mating channel for receiving the "U" shaped removably engagable pin 530
540 Ninety degree rotational locks from the "U" shaped removably engagable pin 530 about the long axis 220 as between the retainer head 495 and the cap 525
545 Second plane
550 Circular rotational movement of the sixth pivotal axis 520 about the longitudinal axis 105

DETAILED DESCRIPTION

With initial reference to FIG. 1 shown is a perspective view of the cutting apparatus 50 that includes the power element 85, a first end portion 90 of the power element 85, a second end portion 95 of the power element 85, a portion of the power element 85 adapted 100 to be grasped by a user's hand 60, and a longitudinal axis 105 of the power element 85. Further, FIG. 1 shows the first removably engagement structure 150 that is interfaced with a fourth removably engagable interface structure 225 of the cutting head assembly 205 that includes the rotatable pivot head 255, the means 340 for selectable rotationally locking the circular movement 370, the cutting blades 230, and the light beam 380 within the third aperture 385.

Figure 2:
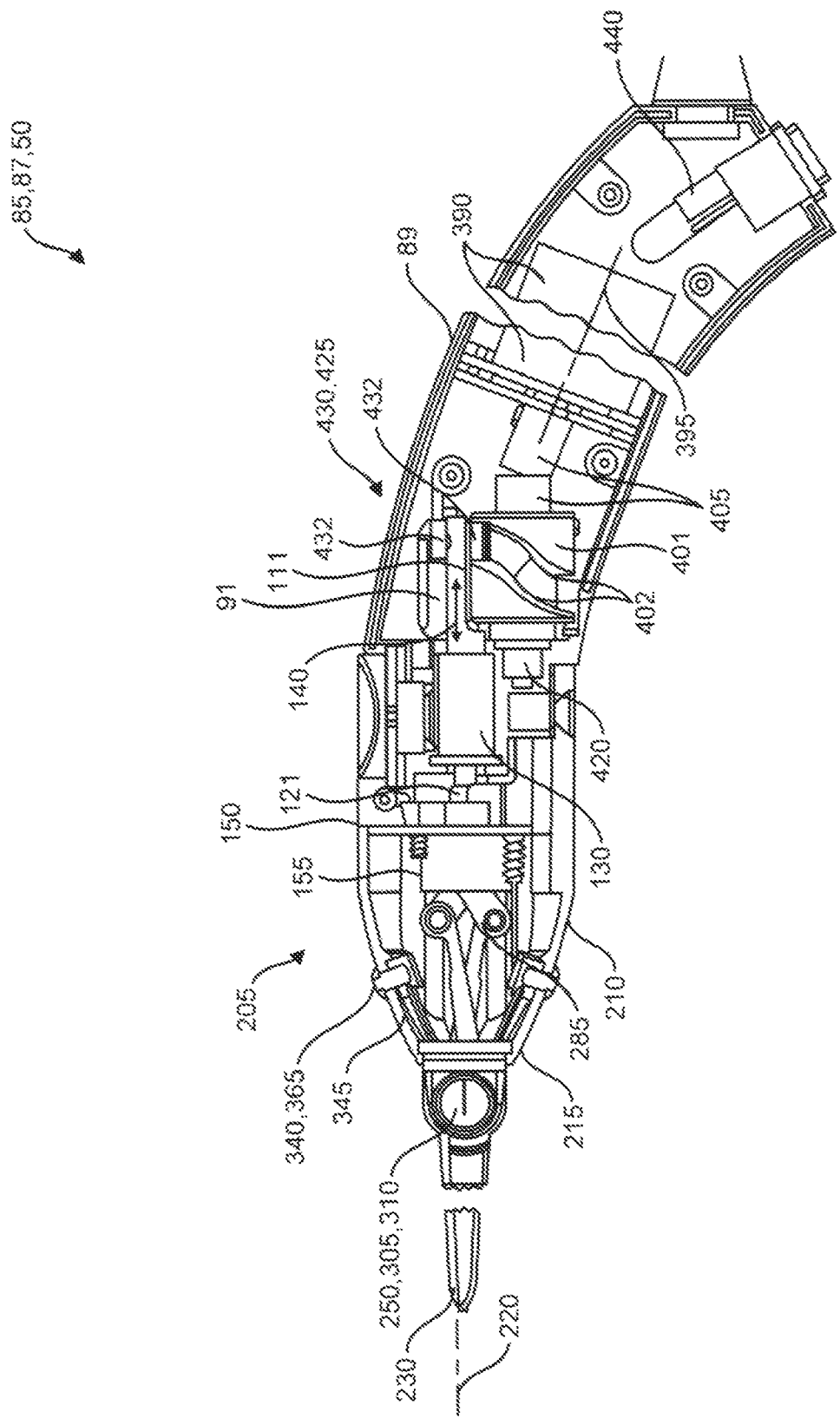
FIG. 2 shows a side elevation cross section from FIG. 1, giving detail of the curved power element along the longitudinal axis with a reciprocating arm having reciprocating movement as driven by the electric drive motor, a rotational axis of the motor, a barrel cam element, a swivel drive rotational coupling of the electric drive motor to the barrel cam element, a reciprocating arm that is slidably engaged to a bushing guide, and the first removably engagable interface structure.

Next, FIG. 2 shows a side elevation cross section from FIG. 1, giving detail of the curved power element 87 along the longitudinal axis 105 with a reciprocating arm 111 having reciprocating movement 140 as driven by the electric drive motor 390, a rotational axis 395 of the motor 390, a barrel cam element 401, a swivel drive rotational coupling 405 of the electric drive motor 390 to the barrel cam element 401, plus the reciprocating arm 111 that is slidably engaged 135 to a bushing guide 130, and the first removably engagable interface structure 150.

Figure 3:
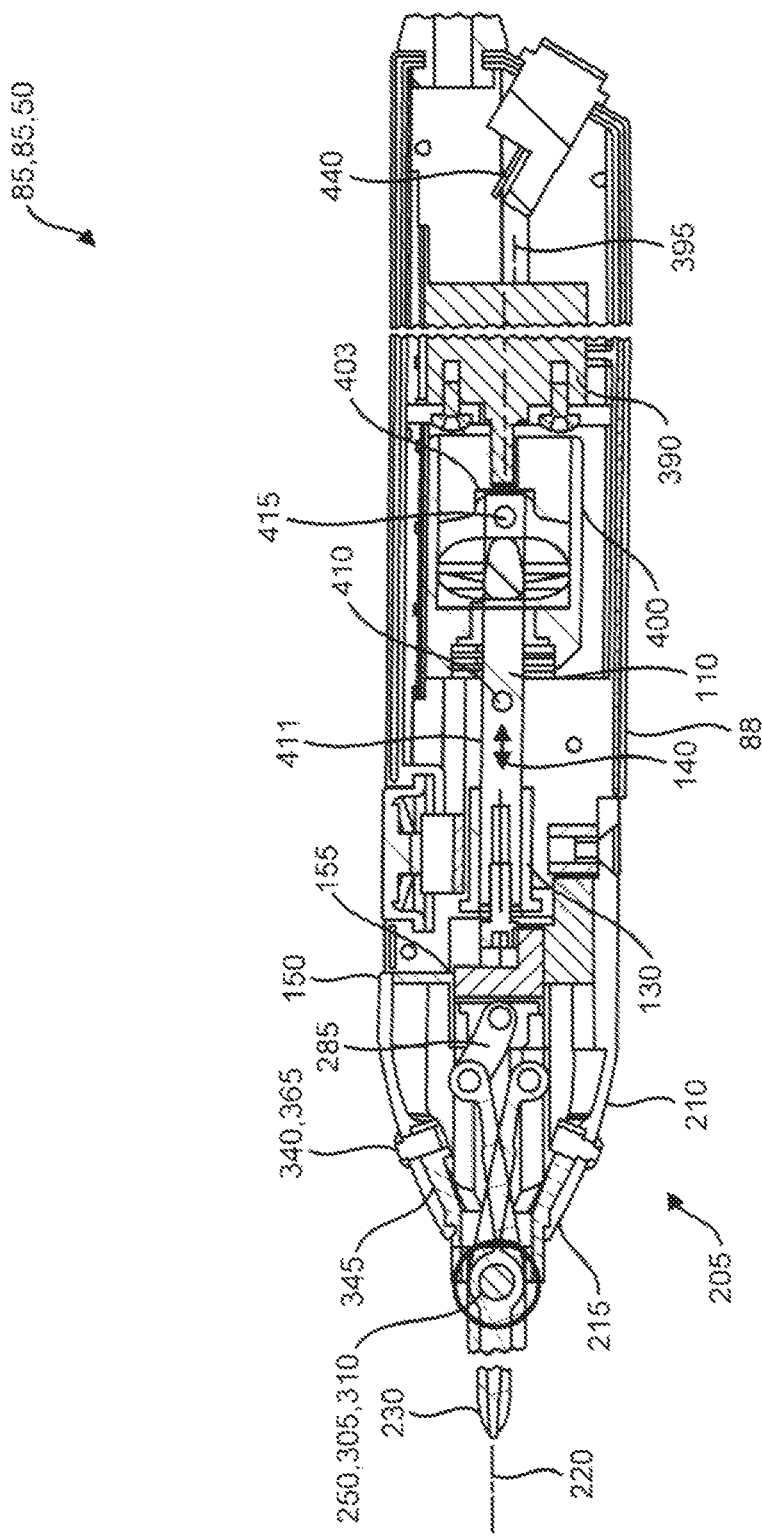

Continuing, FIG. 3 shows a side elevation cross section from FIG. 1, giving detail of the straight power element 86 along the longitudinal axis 105, wherein FIG. 3 shows detail of the power element 86 with the reciprocating arm 110 having reciprocating movement 140 as driven by the electric drive motor 390, the rotational axis 395 of the motor 390, the cam drive element 400, the reciprocating arm 110 that is slidably engaged 135 to the bushing guide 130, and the first removably engagable interface structure 150.

Figure 4:
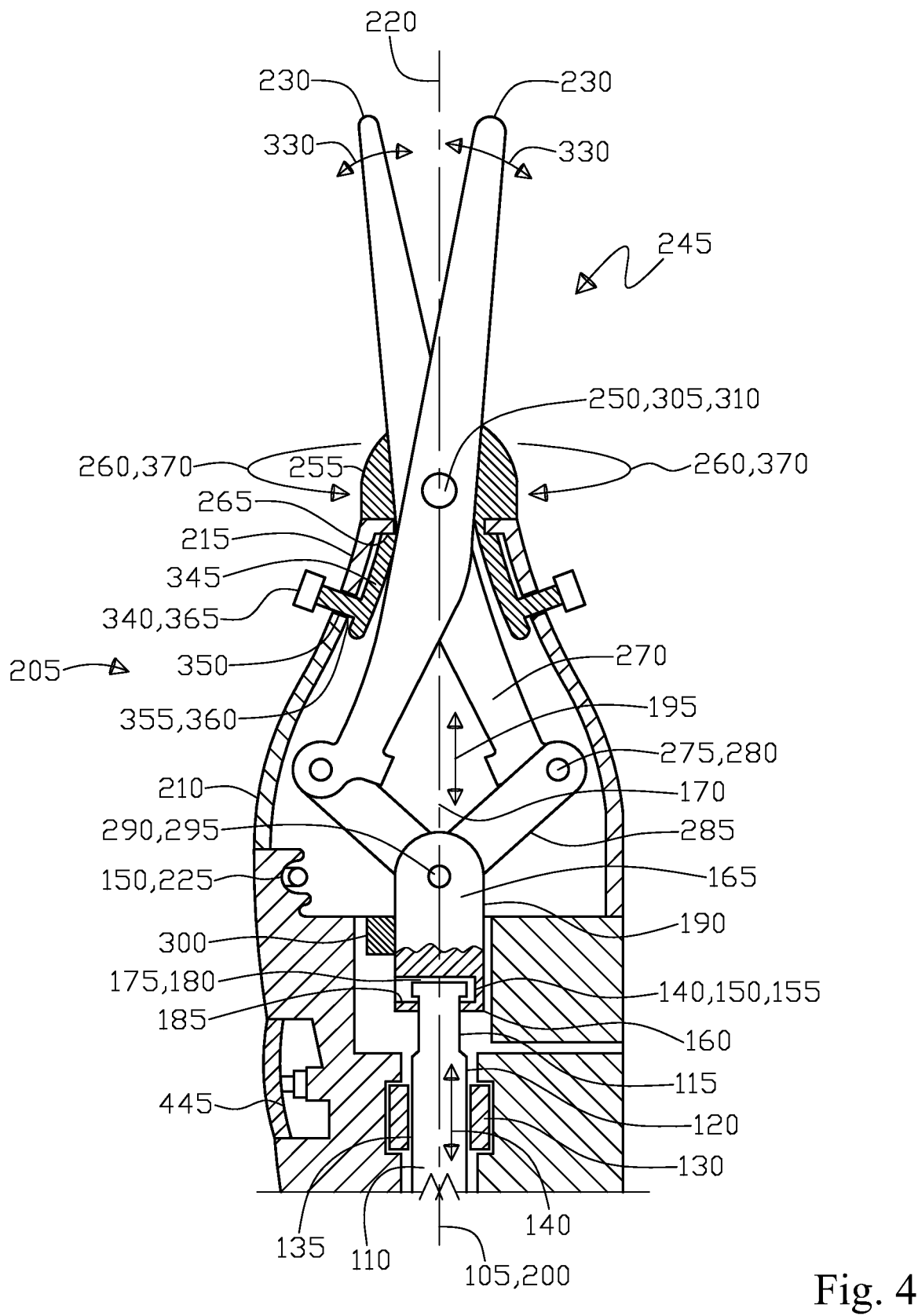
FIG. 4 is cross section 4-4 from FIG. 1 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement, the fourth removably engagable interface structure, a second interface of the removable coupling, a first slotted pivotal aperture of the removable coupling, a third pivotal connection, a pair intermediate linkages, a mid blade section of the cutting blades, the transmission of the reciprocating axial force movement from the reciprocating arm, to the removable coupling, to the pair intermediate linkages at the third pivotal connection, to the second pivotal connection to the mid-blade section of the cutting blades, through a first pivotal connection, and finally to the pair of cutting blades that creates scissors type movement at the free end portion of the cutting blades, and the circular rotational movement about the longitudinal axis for the rotatable pivot head.

Next, FIG. 4 is cross section 4-4 from FIG. 1 showing the removable cutting head assembly 205, the distal end portion 215 of the removable cutting assembly 205, the proximal end portion 210 of the removable cutting assembly 205, the movement 140 of the reciprocating arm 110 from the power element 85, the reciprocating arm 110, the longitudinal axis 105 of the power element 85, and the lengthwise axis 170 of the removable coupling 155.

Further, FIG. 4 shows the coincident position 200 of the lengthwise axis 170 and the longitudinal axis 105, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 370, the fourth removably engagable interface structure 225, a second interface 175 of the removable coupling 155, and a first slotted pivotal aperture 190 of the removable coupling 155.

Also, FIG. 4 shows a third pivotal connection 290, a pair of intermediate linkages 285, a mid-blade section 270 of the cutting blades 230, the transmission of the reciprocating axial force movement 140 from the reciprocating arm 110, to the removable coupling 155, to the pair intermediate linkages 285 at the third pivotal connection 290, to the second pivotal connection 275 to the mid-blade section 270 of the cutting blades 230, through the first pivotal connection 305, and finally to the pair of cutting blades 230 that creates scissors type movement 330 at the free end portion 245 of the cutting blades 230, and the circular rotational movement 370 about the longitudinal axis 105 for the rotatable pivot head 255.

Figure 5:
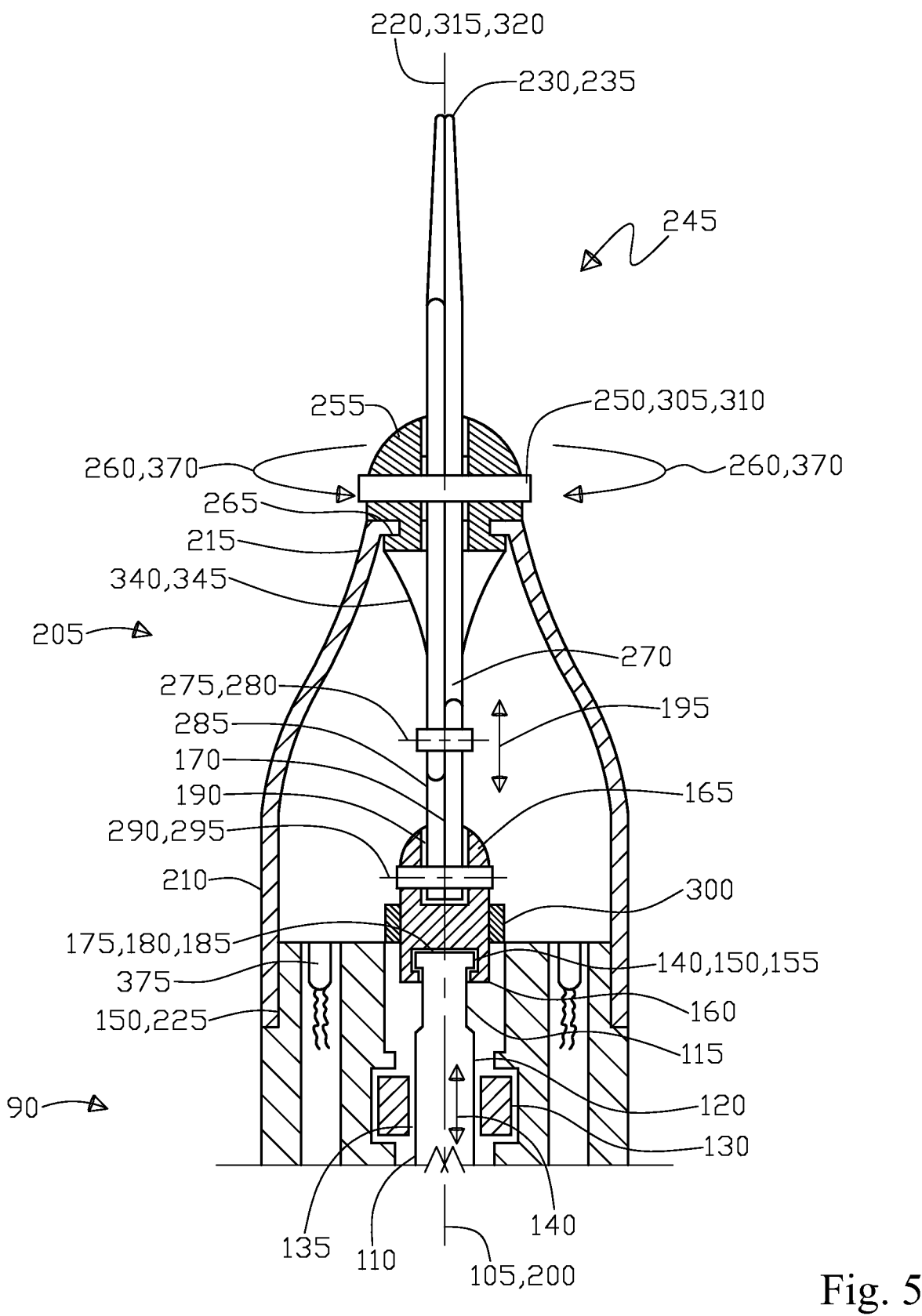
FIG. 5 is cross section 5-5 from FIG. 1 essentially showing FIG. 4 rotated ninety degrees, with FIG. 5 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement and the flexible extension, the fourth removably engagable interface structure, a second interface of the removable coupling, a first slotted pivotal aperture of the removable coupling, a third pivotal connection, a pair intermediate linkages, a mid blade section of the cutting blades, the transmission of the reciprocating axial force movement from the reciprocating arm, to the removable coupling, to the pair intermediate linkages at the third pivotal connection, to the second pivotal connection to the mid-blade section of the cutting blades, through a first pivotal connection, and finally to the pair of cutting blades that creates scissors type movement at the free end portion of the cutting blades that extend in a flat first plane, and the circular rotational movement about the longitudinal axis for the rotatable pivot head.

Further, FIG. 5 is cross section 5-5 from FIG. 1, essentially showing FIG. 4 rotated ninety degrees, with FIG. 5 showing the removable cutting head assembly 205, the distal end portion 215 of the removable cutting assembly 205, the proximal end portion 210 of the removable cutting assembly 205, the movement 140 of the reciprocating arm 110 from the power element 85, the reciprocating arm 110, the longitudinal axis 105 of the power element 85, and the lengthwise axis 170 of the removable coupling 155. Further, FIG. 5 shows the coincident position 200 of the lengthwise axis 170 and the longitudinal axis 105, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 370 and the flexible extension 345, the fourth removably engagable interface structure 225, a second interface 175 of the removable coupling 155, and a first slotted pivotal aperture 190 of the removable coupling 155.

Also, FIG. 5 shows, a third pivotal connection 290, a pair intermediate linkages 285, a mid-blade section 270 of the cutting blades 230, the transmission of the reciprocating axial force movement 140 from the reciprocating arm 110, to the removable coupling 155, to the pair intermediate linkages 285 at the third pivotal connection 290, to the second pivotal connection 275 to the mid-blade section 270 of the cutting blades 230, through the first pivotal connection 305, and finally to the pair of cutting blades 230 that creates scissors type movement 330 at the free end portion 245 of the cutting blades 230 that extend in a flat 320 first 315 plane, and the circular rotational movement 370 about the longitudinal axis 105 for the rotatable pivot head 255.

Figure 6:
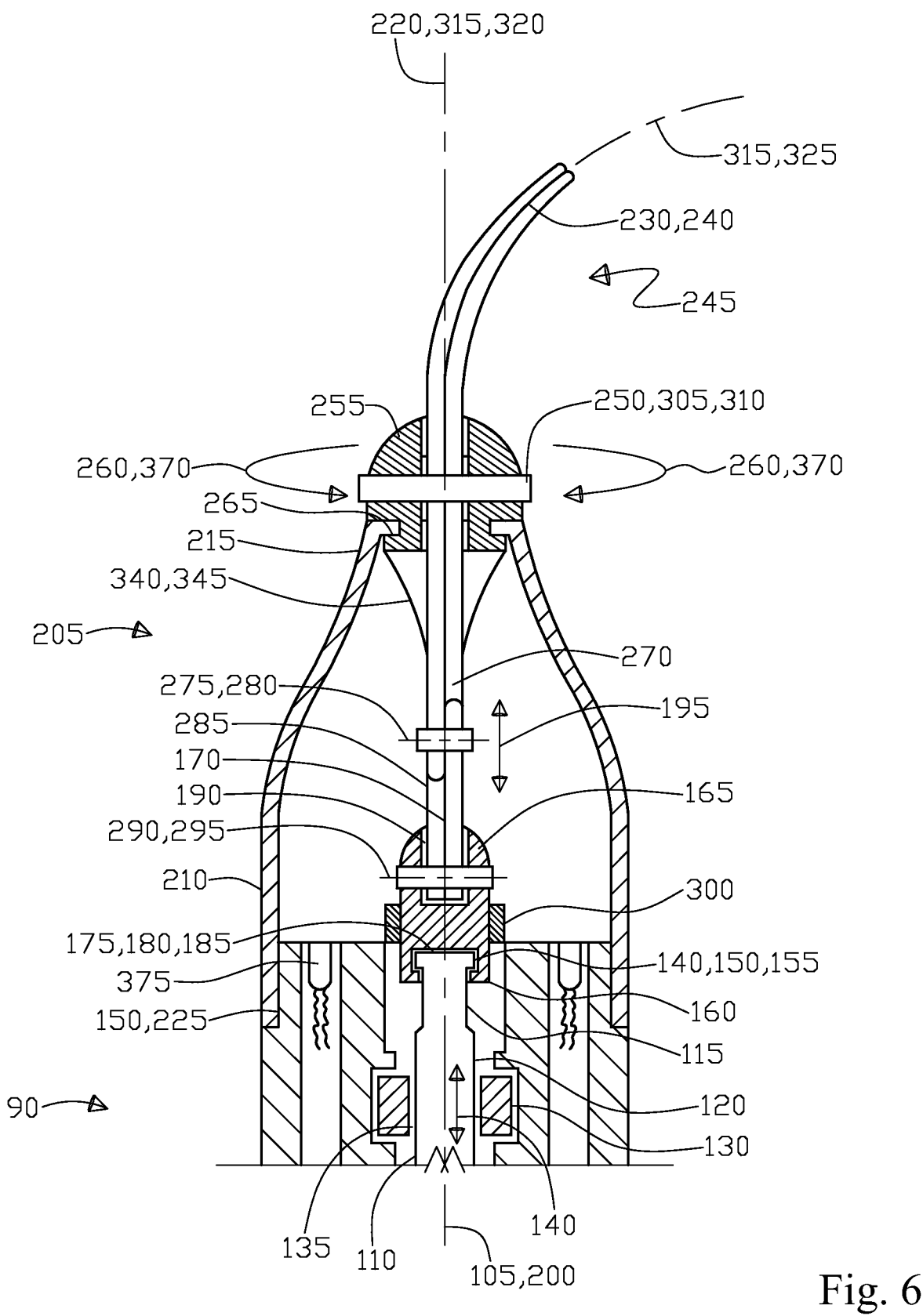
FIG. 6 is cross section 6-6 from FIG. 1 essentially showing FIG. 4 rotated ninety degrees, with FIG. 6 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement and the flexible extension, the fourth removably engagable interface structure, a second interface of the removable coupling, a first slotted pivotal aperture of the removable coupling, a third pivotal connection, a pair intermediate linkages, a mid blade section of the cutting blades, the transmission of the reciprocating axial force movement from the reciprocating arm, to the removable coupling, to the pair intermediate linkages at the third pivotal connection, to the second pivotal connection to the mid-blade section of the cutting blades, through a first pivotal connection, and finally to the pair of cutting blades that creates scissors type movement at the free end portion of the cutting blades that extend in an arcuate first plane, and the circular rotational movement about the longitudinal axis for the rotatable pivot head.

Continuing, FIG. 6 is cross section 6-6 from FIG. 1 essentially showing FIG. 4 rotated ninety degrees and being similar to FIG. 5, with FIG. 6 showing the removable cutting head assembly 205, with the cutting blades 230, through the first pivotal connection 305, and the pair of cutting blades 230 that creates scissors type movement 330 at the free end portion 245 of the cutting blades 230 that extend in an arcuate 325 first 315 plane, and the circular rotational movement 370 about the longitudinal axis 105 for the rotatable pivot head 255.

Figure 7:
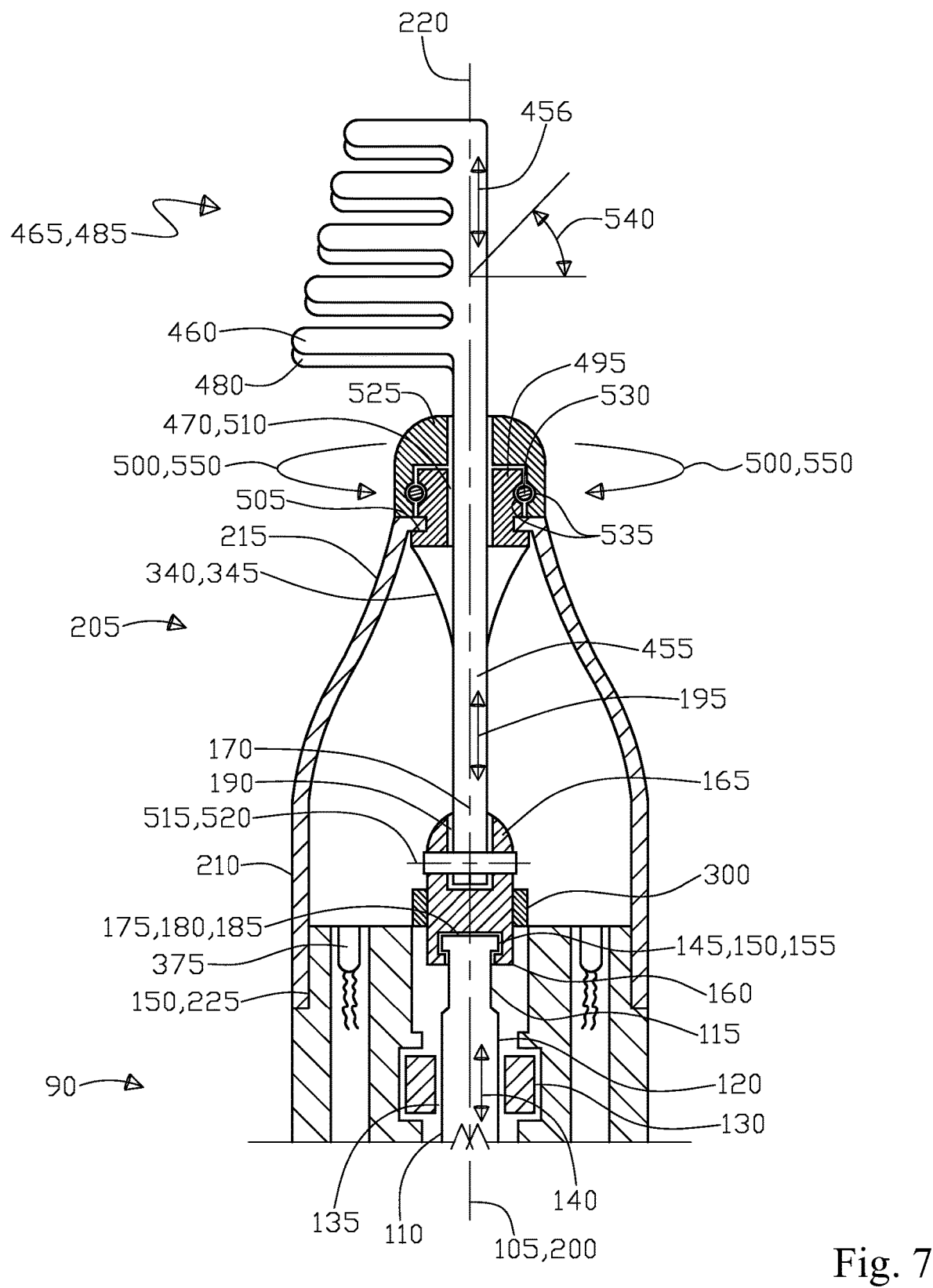
FIG. 7 is cross section 7-7 from FIG. 10 showing the cutting head assembly, the distal end portion of the removable cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement and the flexible extension, the fourth removably engagable interface structure, a second interface of the removable coupling, a first slotted pivotal aperture of the removable coupling, a sixth pivotal connection, a reciprocating cutting blade with transversely positioned reciprocating cutting teeth, the transmission of the reciprocating axial force movement from the reciprocating arm, to the removable coupling, to the reciprocating cutting blade through a slidable engagement in the retainer head, and finally to the transversely positioned reciprocating cutting teeth that have reciprocating movement at their cantilever end portion, and the circular rotational movement about the longitudinal axis for the rotatable retainer head, further shown are a plurality of transversely positioned static cutting teeth.
Figure 10:
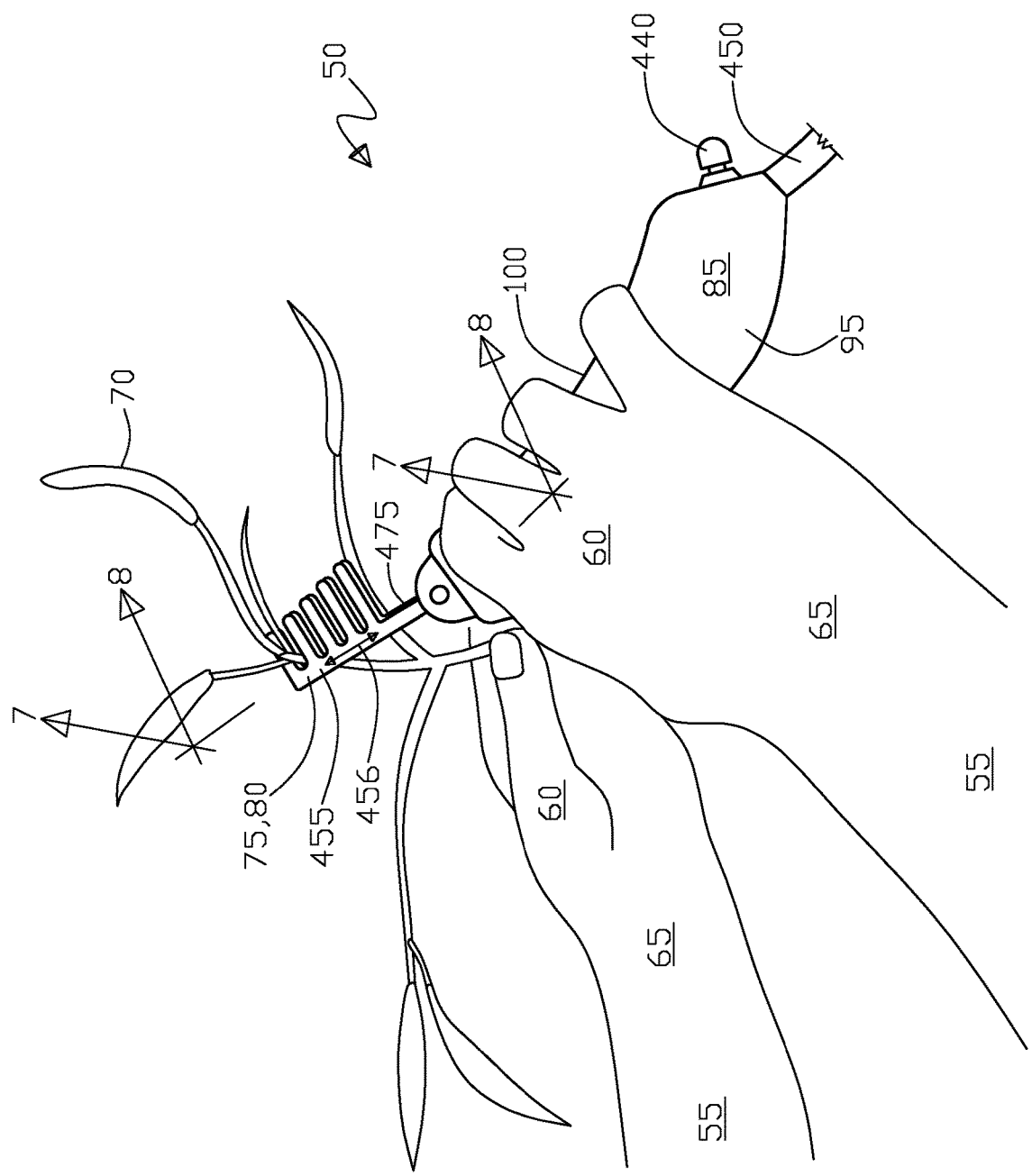
FIG. 10 shows a use drawing of the cutting apparatus with a manual user using their hands from their wrists to manually grasp the second end portion of the power element of the cutting apparatus while using their other hand to grasp the article to be trimmed in a selected portion location using the reciprocating cutting blade transversely positioned cutting teeth sliding against the static cutting blade transversely positioned cutting teeth with their combined hedge trimmer type movement.

Moving onward, FIG. 7 is cross section 7-7 from FIG. 10 showing the removable cutting head assembly 205, the distal end portion 215 of the removable cutting assembly 205, the proximal end portion 210 of the removable cutting head assembly 205, the movement 140 of the reciprocating arm 110 from the power element 85, the reciprocating arm 110, the longitudinal axis 105 of the power element 85, and the lengthwise axis 170 of the removable coupling 155.

Further, FIG. 7 shows the coincident position 200 of the lengthwise axis 170 and the longitudinal axis 105, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 500, 550, and the flexible extension 345, the fourth removably engagable interface structure 225, a second interface 175 of the removable coupling 155, and a first slotted pivotal aperture 190 of the removable coupling 155.

Also FIG. 7 shows a sixth pivotal connection 515, a reciprocating cutting blade 455 with transversely positioned reciprocating cutting teeth 460, the transmission of the reciprocating axial force movement 140 from the reciprocating arm 110, to the removable coupling 155, to the reciprocating cutting blade 455 through a slidable engagement 470 in the retainer head 495, and finally to the transversely positioned reciprocating cutting teeth 460 that have reciprocating movement 456 at their cantilever end portion 465, and the circular rotational movement 500, 550 about the longitudinal axis 105 for the rotatable retainer head 495, further shown are a plurality of transversely positioned static cutting teeth 480.

Figure 8:
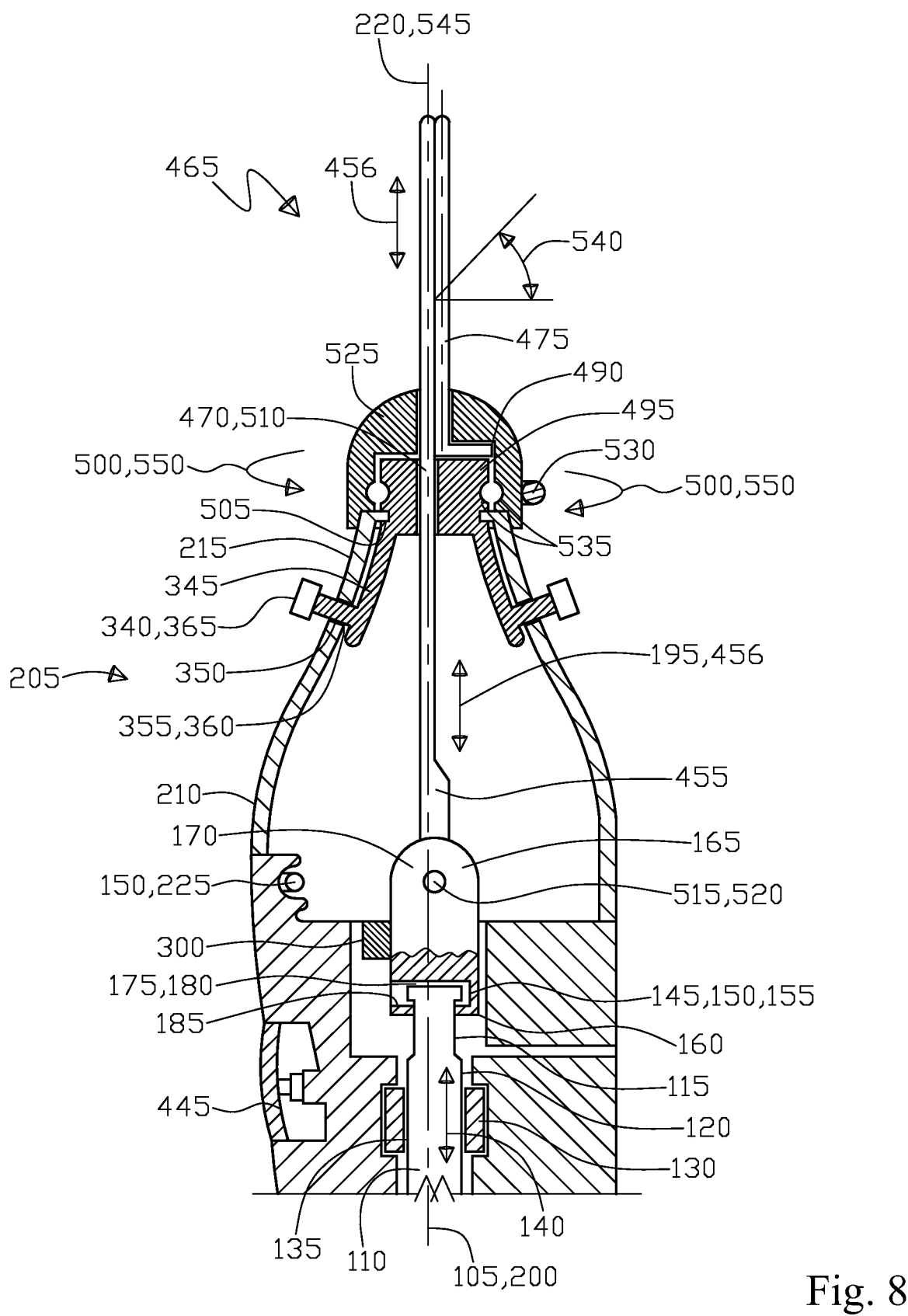
FIG. 8 is cross section 8-8 from FIG. 10 essentially showing FIG. 7 rotated ninety degrees, with FIG. 8 showing the removable cutting head assembly, the distal end portion of the cutting assembly, the proximal end portion of the cutting assembly, the movement of the reciprocating arm from the power element, the reciprocating arm, the longitudinal axis of the power element, the lengthwise axis of the coupling, the coincident position of the lengthwise axis and the longitudinal axis, the first end portion of the power element, the removable coupling, the primary end portion of the coupling, the secondary end portion of the coupling, a second interface for the first removably engagable rotatable couple, the means for selectable rotationally locking the circular movement and the flexible extension, the fourth removably engagable interface structure, a second interface of the removable coupling, a first slotted pivotal aperture of the removable coupling, a sixth pivotal connection, a reciprocating cutting blade with transversely positioned reciprocating cutting teeth (not shown), the transmission of the reciprocating axial force movement from the reciprocating arm, to the removable coupling, to the reciprocating cutting blade through a slidable engagement in the retainer head, and finally to the transversely positioned reciprocating cutting teeth (not shown) that have reciprocating movement at their cantilever end portion, and the circular rotational movement about the longitudinal axis for the rotatable retainer head, further shown is the static cutting blade with its transversely positioned static cutting teeth (not shown), wherein the static cutting blade is retained in a cap that is rotatably pinned to the rotatable retainer head through a plurality of mating channels.

Yet, further, FIG. 8 is cross section 8-8 from FIG. 10 essentially showing FIG. 7 rotated ninety degrees, with FIG. 8 showing the removable cutting head assembly 205, the distal end portion 215 of the removable cutting head assembly 205, the proximal end portion 210 of the removable cutting head assembly 205, the movement 140 of the reciprocating arm 110 from the power element 85, the reciprocating arm 110, the longitudinal axis 105 of the power element 85, and the lengthwise axis 170 of the removable coupling 155.

Further, FIG. 8 the coincident position 200 of the lengthwise axis 170 and the longitudinal axis 105 are shown, the first end portion 90 of the power element 85, the removable coupling 155, the primary end portion 160 of the removable coupling 155, the secondary end portion 165 of the removable coupling 155, a second interface 175 for the first removably engagable rotatable couple 145, the means 340 for selectable rotationally locking the circular movement 500, 550, and the flexible extension 345, plus the fourth removably engagable interface structure 225, a second interface 175 of the removable coupling 155, and a first slotted pivotal aperture 190 of the removable coupling 155.

Continuing, FIG. 8 shows the sixth pivotal connection 515, the reciprocating cutting blade 455 with transversely positioned reciprocating cutting teeth 460 (not shown), the transmission of the reciprocating axial force movement 140 from the reciprocating arm 110, to the removable coupling 155, to the reciprocating cutting blade 455 through the slidable engagement 470 in the retainer head 495, and finally to the transversely positioned reciprocating cutting teeth 460 (not shown) that have reciprocating movement 456 at their cantilever end portion 465. Also FIG. 8 shows the circular rotational movement 500, 550 about the longitudinal axis 105 for the rotatable retainer head 495, further shown is the static cutting blade 475 with its transversely positioned static cutting teeth 480 (not shown), wherein the static cutting blade 475 is retained 490 in a cap 525 that is rotatably pinned 530 to the rotatable retainer head 495 through a plurality of mating channels 535.

Figure 9:
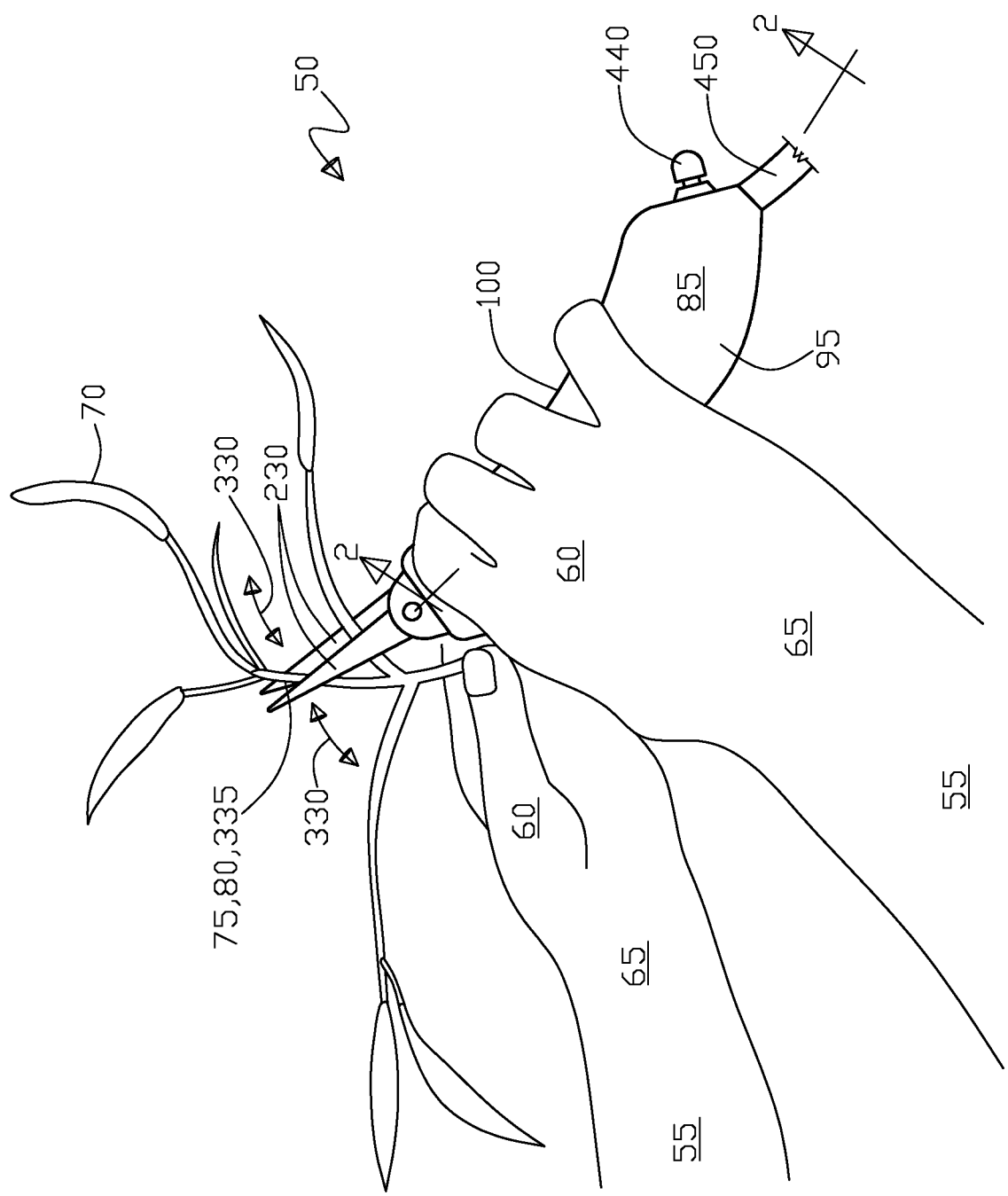
FIG. 9 shows a use drawing of the cutting apparatus with a manual user using their hands from their wrists to manually grasp the second end portion of the power element of the cutting apparatus while using their other hand to grasp the article to be trimmed in a selected portion location using the pair of open cutting blades with their scissor type movement.

Further, FIG. 9 shows a use drawing of the cutting apparatus 50 with a manual user 55 using their hands 60 from their wrists 65 to manually grasp 100 the second end portion 95 of the power element 85 of the cutting apparatus 50 while using their other hand 60 to grasp 100 the article 70 to be trimmed 75 in a selected 335 portion 80 location using the pair of open cutting blades 230 with their scissor type movement 330.

Next, FIG. 10 shows a use drawing of the cutting apparatus 50 with a manual user 55 using their hands 60 from their wrists 65 to manually grasp 100 the second end portion 95 of the power element 85 of the cutting apparatus 50 while using their other hand 60 to grasp 100 the article 70 to be trimmed 75 in a selected portion 80 location using the reciprocating cutting blade 455 transversely positioned cutting teeth 460 sliding against the static cutting blade 475 transversely positioned cutting teeth 480 with their combined hedge trimmer type movement.

Figure 11:
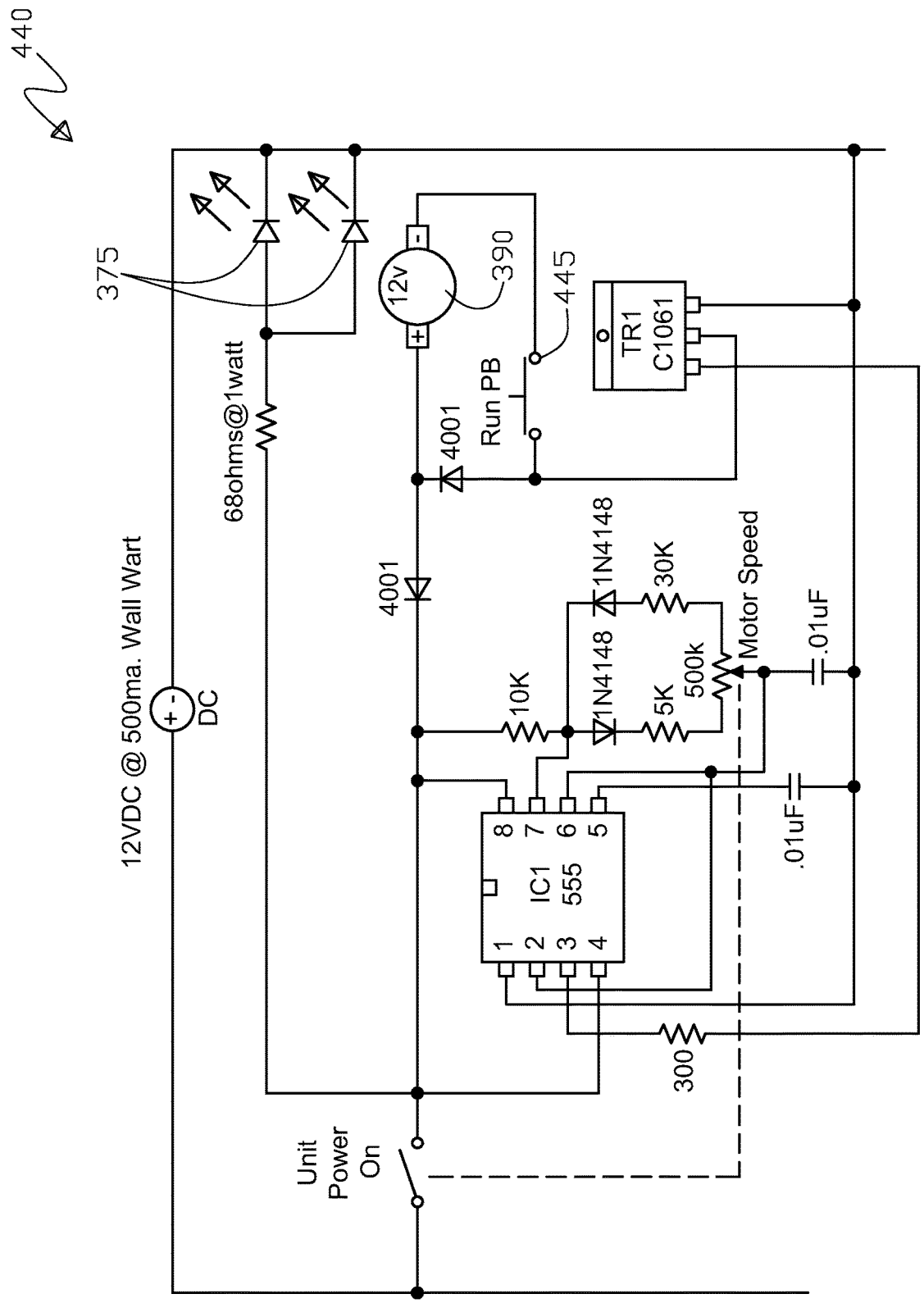
FIG. 11 shows an electrical schematic diagram of circuitry for the cutting apparatus that is positioned in FIGS. 2 and 3; the circuitry shown includes the lights, the motor, and the normally open switch, plus other components that are known in the art.

Continuing, FIG. 11 shows an electrical schematic diagram of circuitry 440 for the cutting apparatus 50 that is positioned in FIGS. 2 and 3, the circuitry 440 shown includes the lights 375, the motor 390, and the normally open switch 445, plus other components that are known in the art.

Figure 12:
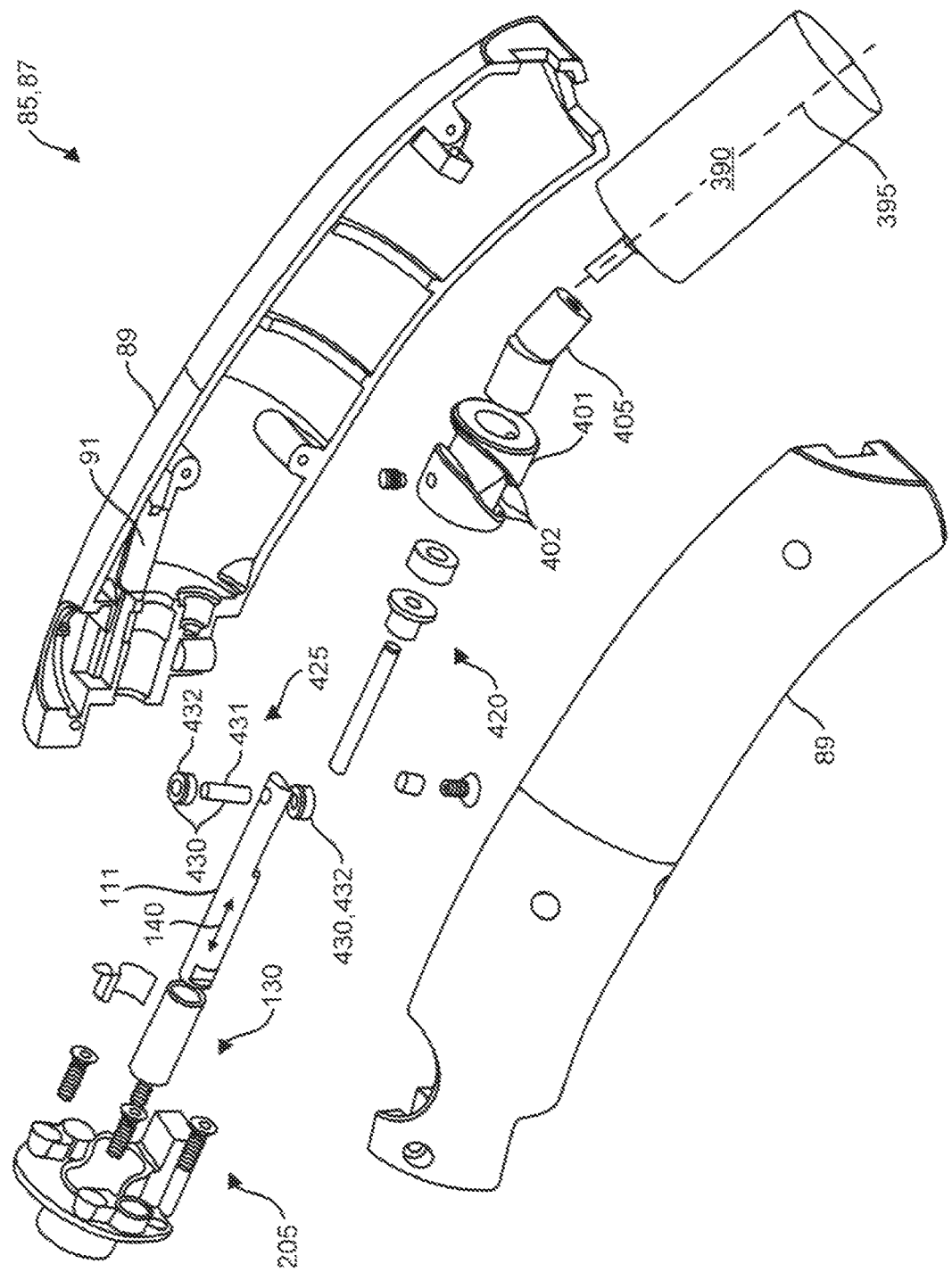
FIG. 12 is an exploded perspective view of the curved power element including the motor, the swivel drive coupling, the barrel cam element, the reciprocating arm having reciprocating movement within the bushing guide, all being disposed within the curved housing.

Next, FIG. 12 is an exploded perspective view of the curved power element 87 including the motor 390, the swivel drive coupling 405, the barrel cam element 401, the reciprocating arm 111 having reciprocating movement 140 within the bushing guide 130, all being disposed within the curved housing 89.

Figure 13:
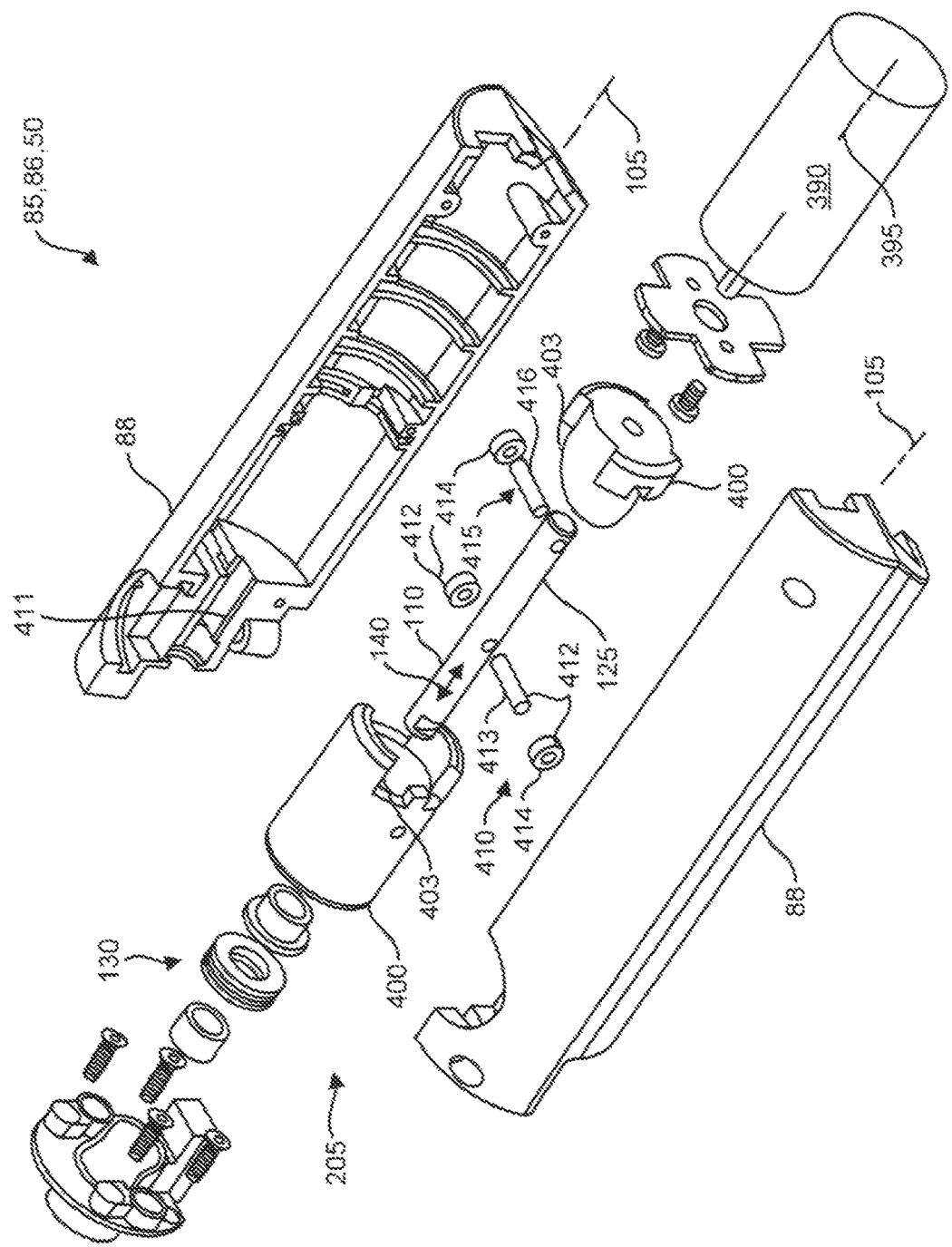
FIG. 13 is an exploded perspective view of the straight power element including the motor, the cam drive element, the reciprocating arm having reciprocating movement within the bushing guide, all being disposed within the straight housing.

Further, FIG. 13 is an exploded perspective view of the straight power element 86 including the motor 390, the cam drive element 400, the reciprocating arm 110 having reciprocating movement 140 within the bushing guide 130, all being disposed within the straight housing 88.

Figure 14:
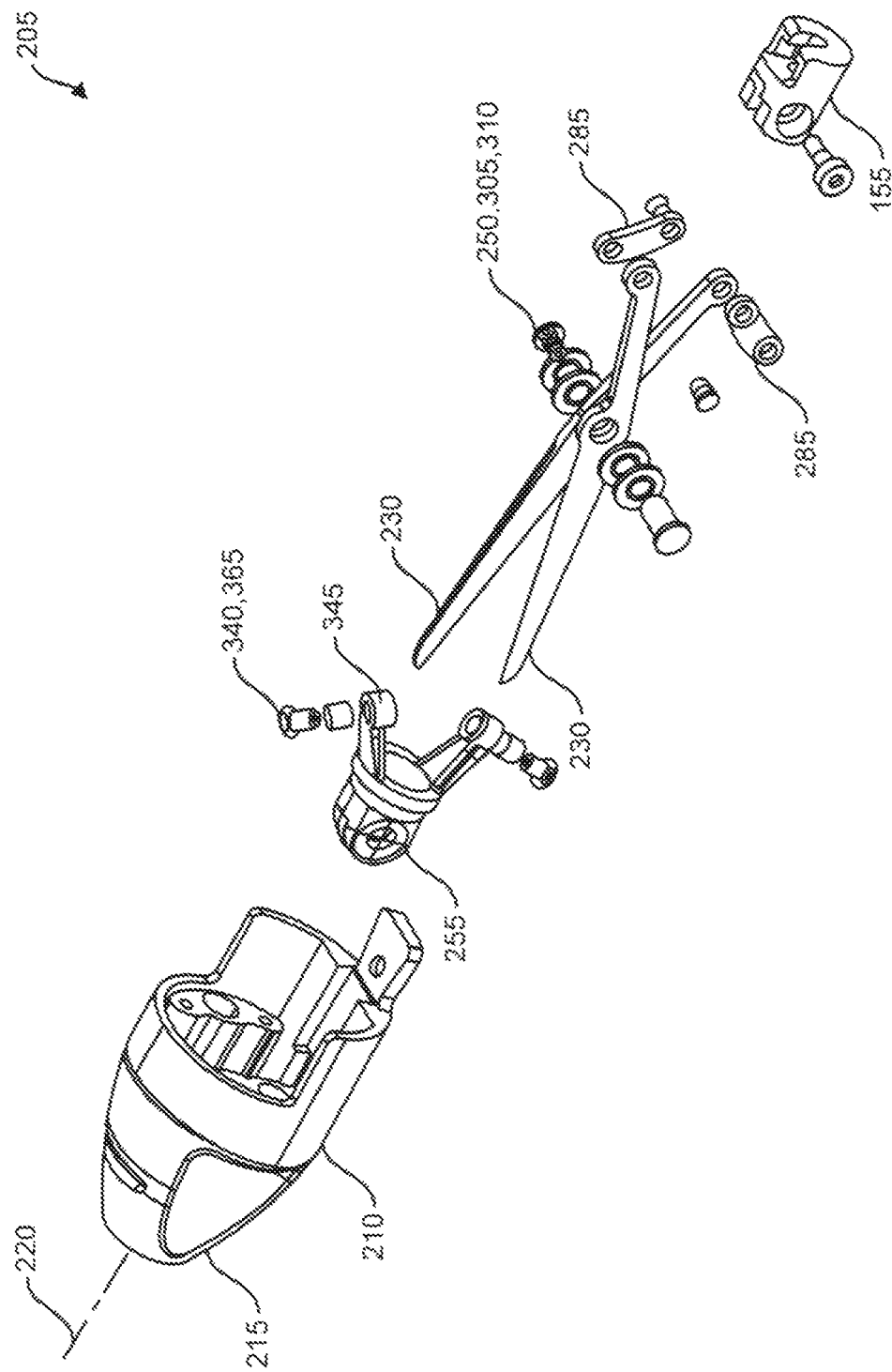
FIG. 14 is an exploded perspective view of the removable cutting head assembly in particular that includes the pair of cutting blades with the pivotal attachment, the intermediate linkages, the removable coupling (that axially connects to the reciprocating arm 110, 111 not shown), the rotatable pivot head, with the proximal and distal end portions of the removable cutting head assembly.

Moving onward, FIG. 14 is an exploded perspective view of the removable cutting head assembly 205 in particular that includes the pair of cutting blades 230 with the pivotal attachment 250, 305, 310, the intermediate linkages 285, the removable coupling 155 (that axially connects to the reciprocating arm 110, 111 not shown), the rotatable pivot head 255, with the proximal 210 and distal 215 end portions of the removable cutting head assembly 205.

Figure 15:
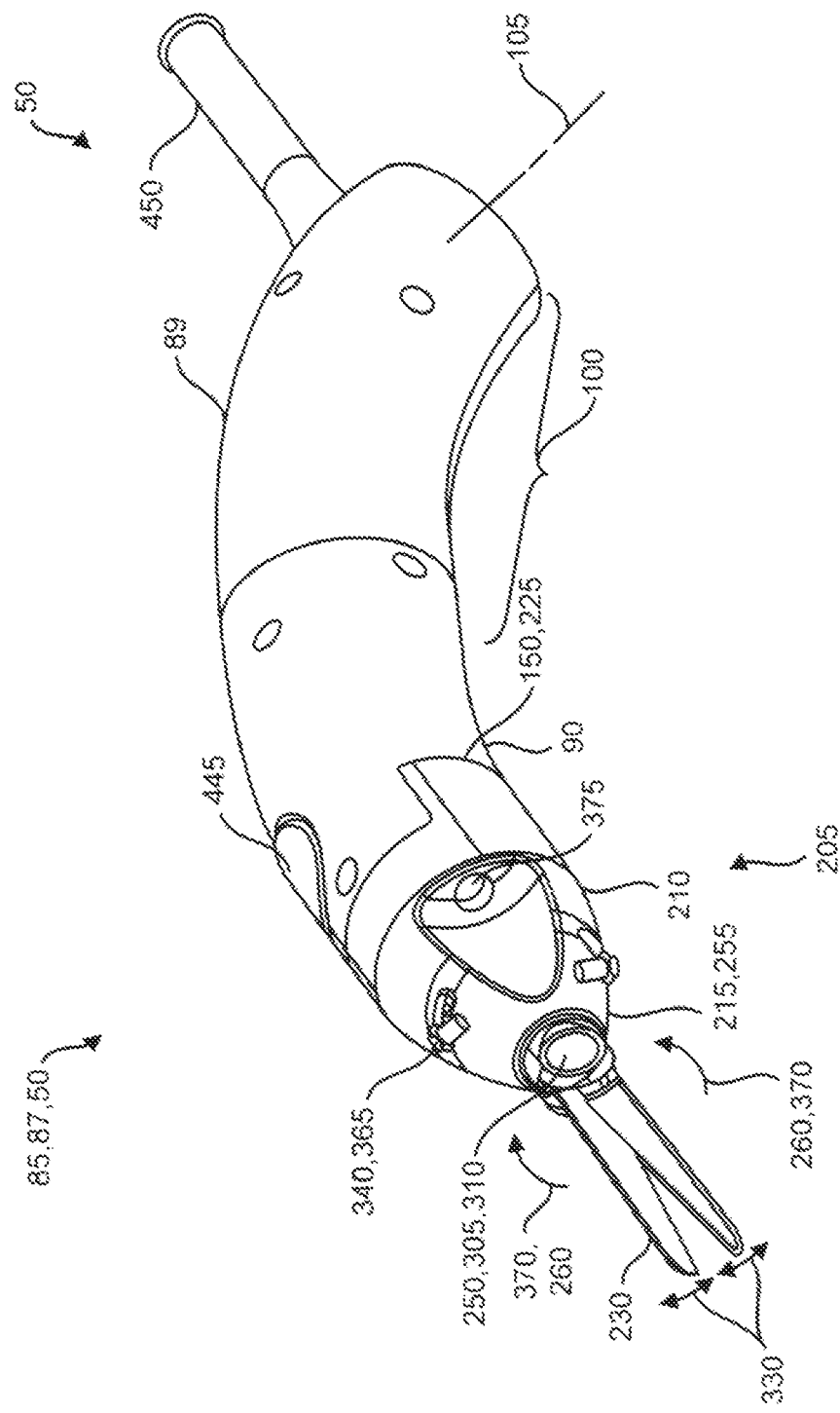
FIG. 15 shows an assembled perspective view of the curved housing cutting apparatus that includes the cutting blades, the removably cutting head assembly, the curved housing, and the electrical power cord sleeve.

Continuing, FIG. 15 shows an assembled perspective view of the curved housing 87 cutting apparatus 50 that includes the cutting blades 230, the removable cutting head assembly 205, the curved housing 89, and the electrical power cord sleeve 450.

Broadly in looking at FIGS. 1 to 6, and FIGS. 9 to 11, the cutting apparatus 50 for trimming 75 the selected portion 80 from the article 70 is shown, wherein the cutting apparatus 50 includes the power element 85 that has the first end portion 90 and an opposing second end portion 95 with the longitudinal axis 105 spanning therebetween, see FIGS. 1 to 3 in particular. Wherein, the first end portion 90 has the reciprocating arm 110 having the reciprocating movement 140 along the longitudinal axis 105 and the second end portion 95 is adapted 100 to be grasped by the manual user's 55 hand 60, see FIGS. 9 and 10, with the reciprocating arm 110 extending in a cantilever section 120 having the first removably engagable rotatable couple 145 annulus 115 that is about the longitudinal axis 105 and the first end portion 90 also having the first removably engagable interface structure 150, again as best shown in FIGS. 1 to 5. The reciprocating movement 140 is created by a motor 390 via being rotationally connected to a cam drive element 400, 401 utilizing a means 415, 425, 410 for the reciprocating arm 110, 111 to dynamically interface with the cam drive element 400, 401, see FIGS. 2, 3, 12, and 13.

Also included on the cutting apparatus 50 is the removable coupling 155 having the primary end portion 160 and the opposing secondary end portion 165 with the lengthwise axis 170 spanning therebetween, with the primary end portion 160 having the removably engagable rotationally free movement about the longitudinal axis 105 second interface 175 that forms the removably engagable rotatable couple with the reciprocating arm 110 cantilever section 120 rotatable couple annulus 115 and the secondary end portion 165 having the first slotted pivotal aperture 190, see in particular FIGS. 4 to 8. Wherein, the removably engagable rotatable couple 155 transmits 195 reciprocating axial force movement 140 along the lengthwise axis 170 and the longitudinal axis 105, wherein positionally the lengthwise axis 170 and the longitudinal axis 105 are coincident 200 to one another, as best shown in FIGS. 4 to 8.

Further included in the cutting apparatus 50 is the removable cutting head assembly 205 having the proximal end portion 210 and the opposing distal end portion 215 with the long axis 220 spanning therebetween, the proximal end portion 210 includes a fourth removably engagable interface structure 225 that removably engages with the first removably engagable structure 150 such that the long axis 220 and the longitudinal axis 105 are coincident 200 to one another, see FIGS. 4 to 8. The distal end portion 215 extends outward 235 into having the pair of open cutting blades 230 that each have a free end portion 245 and an opposing first pivotally attached 250 portion forming the first pivotal connection 305 with the first pivotal axis 310 that is disposed within the rotatable pivot head 255, see FIGS. 4 to 6.

Wherein the rotatable pivot head 255 is rotatable 260 about the long axis 220 within the distal end portion 215 as the pivot head 255 has a rotatable couple third interface structure 265 with the distal end portion 215 that allows the pivot head 255 to have movement 370 while the pivot head 255 is retained in the distal end portion 215, the cutting blades 230 also extend toward the proximal end portion 210 with the pair of mid-blade sections 270 therebetween, the mid-blade portions 270 each have a second pivotal connection 275 with the second pivotal axis 280 to the pair of intermediate linkages 285, again see FIGS. 4 to 8. Wherein the linkages 285 have the single third pivotal connection 290 with the third pivotal axis 295 to one another and to the first slotted pivotal aperture 190 of the removable coupling 155 that is slidably engaged through a loop structure 300 in the proximal end portion 210 to maintain the reciprocating movement 140 into alignment. Wherein the first pivotal connection 305 through the first pivotal axis 310, the cutting blade 230 free end portions 245 having the scissor type movement 330 in the first plane 315, see FIGS. 4, 5, and 6.

Wherein operationally, the reciprocating arm 110 drives through the removable coupling 155 to the pair of intermediate linkages 285 and the cutting blades 230 such that the cutting blade 230 free end portions 245 have the scissor movement 330 from the first pivotal connection 305 to the cutting blade 230 free ends 245 that are functional to cut 75 the article 70. Further, the rotatable pivot head 255 is selectably rotatable through movement 370, wherein the first 310, second 280, and third 295 pivotal axes all rotate in unison in a circular movement 370 about the longitudinal axis 105 allowing the scissor type movement 330 in the first plane 315 to be selectively rotatable 370 about the longitudinal axis 105, see FIGS. 4 to 6. This results in the first cutting plane 315 having rotational 370 adjustment relative to the manual grasp 100 by the user's hand 60, further the removable cutting head assembly 205 and the removable coupling 155 are removably engagable from the power element 85 via the first 150, second 175, and fourth 225 removably engagable interfaces, such that the removable cutting head assembly 205 can be safely immersed into a cleaning solution separate from the power element 85, see FIGS. 1 to 6.

Optionally, for the cutting apparatus 50 for trimming 75 the selected portion 80 from the article 70, the coupling 155 that is removably engagable and rotationally free about the longitudinal axis 105 second interface 175 is preferably constructed of a T-slot 180 positioned perpendicular to the lengthwise axis 170 with a single outward radially oriented opening 185. Wherein the T-slot 180 slidably engages the reciprocating arm 110 annulus 115 for the transmission of the reciprocating movement 140 axial force while allowing free rotation for movement 370 via the t-slot 180 and annulus 115 interface and removable engagement is facilitated via the opening 185 for the separation of the reciprocating arm 110 and the removable coupling 155 that ultimately allows for the separation of the power element 85 from the cutting head assembly 205, as best shown in FIGS. 4 to 8.

Further, optionally, on the cutting apparatus 50 for trimming 75 the selected portion 80 from the article 70, can further comprise a means 340 for selectably rotationally locking the circular movement 370 in a plurality of angular positions, as best shown in FIGS. 4 to 10. Continuing, for the means 340 for selectably rotationally locking the circular movement 370 in a plurality of angular positions, is preferably constructed of a flexible extension 345 that projects in a cantilever manner away from the rotatable pivot head 255 in an outward direction from the third interface structure 265, 505 and in a direction opposite that of the first pivotal axis 310, or the channel 535 relation to the third interface structure 265, 505. The flexible extension 345 terminates in a protrusion 350 that frictionally projects 360 therethrough a second aperture 355 disposed in the distal end portion 215, as shown in FIG. 1 and FIGS. 4 to 8. Further, optionally the protrusion 350 and the second aperture 355 further preferably comprise a clamp 365 to help secure the protrusion 350 and the second aperture 355 to one another to further facilitate the selectable rotational locking of the circular movement 370 in a plurality of angular positions, see FIG. 1 and FIGS. 4 to 8.

Referring in particular to FIG. 5 for the cutting apparatus 50 for trimming 75 a selected portion 80 from the article 70, the pair of open cutting blade 230 free end portions 245 are straight 235 extending outward from the first pivotal connection 305 having the scissor type movement 330 in the first plane 315 that is in a flat plane 320 to operationally facilitate direct perpendicular cuts 75 of the article 70. Next, also referring in particular to FIG. 6 for the cutting apparatus 50 for trimming 75, a selected portion 80 from the article 70, the pair of open cutting blade 230 free end portions 245 can have an arcuate shape 240 extending outward from the first pivotal connection 305 having the scissor type movement 330 in the first plane 315 that is the arcuate plane 325 being operationally to facilitate direct angular cuts 75 of the article 70.

Another option for the cutting apparatus 50 for trimming 75 a selected portion 80 from an article 70, wherein the power element 85 second end portion 95 can further comprise the light 375 that emits the light beam 380 therethrough the third aperture 385 in the removable cutting head assembly 205 to operationally allow the light beam 380 to illuminate the pair of open cutting blade 230 free end portions 245 or the reciprocating cutting blade 455 and the static cutting blade 475, see FIGS. 1 to 3, 5 to 7, and 11.

As an optional enhancement to the cutting apparatus 50 for trimming 75 the selected portion 80 from the article 70, wherein the power element 85 can further comprises circuitry 440 to accommodate selectable adjustment of a rotational speed on the motor 390, thus is effect selectably controlling a speed of the scissor movement 330 or the reciprocating blade 455 movement 456 in relation to the static 475 cutting blades, see FIG. 11, plus FIGS. 2 and 3.

As a further optional enhancement to the cutting apparatus 50 for trimming the selected portion 80 from the article 70, wherein the power element 85 can further comprise a normally open switch 445 to the motor 390, wherein operationally the user 55 has to manually continuously activate or push down upon the normally open switch 445 to activate the motor 390 for safety while using the cutting apparatus, being termed a "dead man" switch, wherein if the switch 445 is released the motor 390 will deactivate, see FIG. 11, plus FIGS. 1, 2, 4, and 8.

As a convenience option for the cutting apparatus 50 for trimming 75 the selected portion 80 from the article 70, wherein the power element 85 first end portion 90 can further comprise a substantially rigid electrical power cord sleeve 450 that extends from the first end portion 90 to operationally help prevent entanglement of a power cord while the cutting apparatus 50 is in use by the user 55, see FIGS. 1 to 3 and 9 to 10.

As the cutting blades 230, 455, 475 are removable from the cutting apparatus 50 via the removable cutting head assembly 205, an alternative set of cutting blades 455, 475, are shown in FIGS. 7 and 8, which are described as follows for the cutting apparatus 50 for trimming the selected portion 80 from the article 70. Starting with the power element 85 and the removable coupling 155 as previously described, and looking at the removable cutting head assembly 205 in particular that has the proximal end portion 210 and the opposing distal end portion 215 with the long axis 220 spanning therebetween. Wherein, the proximal end portion 210 includes the fourth removably engagable interface structure 225 that removably engages with the first removably engagable structure 150 such that the long axis 220 and the longitudinal axis 105 are coincident 200 to one another, the distal end portion 215 extends outward along the long axis 220 into having the reciprocating cutting blade 455 that has the plurality of transversely positioned reciprocating cutting teeth 460 that are external to the distal end portion 215 on a cantilever end portion 465, see FIG. 7 in particular.

The reciprocating cutting blade 455 on an end opposing the cutting teeth 460 has a slidably engaged 510 portion 470 that is disposed within the rotatable retainer head 495, as a reciprocating movement 456 guide, wherein the retainer head 495 is rotatable 500, 550 about the long axis 220 within the distal end portion 215 as the retainer head 495 has a rotatable couple third interface structure 505 with the distal end portion 215 as previously described for the third interface structure 265. The reciprocating cutting blade 455 also extends toward the proximal end portion 210 further opposite of the cutting teeth 460 for a sixth pivotal connection 515 having a sixth pivotal axis 520 to the first slotted pivotal aperture 190 of the removable coupling 155 that is slidably engaged through the loop structure 300 to the proximal end portion 210 to maintain the reciprocating movement 140. Further included is the static cutting blade 475 that is retained 490 in the cap 525, see FIG. 8, wherein the cap 525 is rotatably removably engaged to the rotatable retainer head 495 via a "U" shaped removably engagable pin 530 that is received into a pair of mating channels 535 that are disposed between the rotatable retainer head 495 and the cap 525, again see FIGS. 7 and 8.

The pin 530 facilitates ninety degree rotational locks 540 about the long axis 220 as between the rotatable retainer head 495 and the cap 525. The rotatable retainer head 495 is slidably 510 in contact at portion 470 with the reciprocating cutting blade 455 acting as a guide to the reciprocating movement 456. The static cutting blade 475 also has a plurality of transversely positioned static cutting teeth 480 that are in slidable contact with the reciprocating cutting teeth 460 forming a hedge trimmer type arrangement, the reciprocating cutting teeth 460 and the static cutting teeth 480 have movement in a second plane 545 external to the distal end portion 215 where the reciprocating blade is cantilever 465 and the static cutting blade is cantilever 485.

Wherein operationally, the reciprocating arm 110 drives through the coupling 155 to the reciprocating cutting blade 455, see FIGS. 7 and 8, such that with the static cutting blade 475 have the hedge trimmer type movement that is functional to cut 75 the article 70, see FIG. 10, further the rotatable retainer head 495 is selectably rotatable as is the cap 525, via pulling and reinserting the pin 530 in ninety degree increments about the long axis 220 as the channels 535 "box" or form a square in the retainer head 495 about the long axis 220, see FIGS. 7 and 8. Further, the sixth pivotal axis 520 rotates in a circular movement 550 about the longitudinal axis 105 allowing the hedge trimmer type movement in the second plane 545 to be selectively rotatable 550 about the longitudinal axis 105, resulting in the second cutting plane 545 having rotational 550 adjustment relative to the manual grasp by the user's 55 hand 60. Further, the cutting head assembly 205 and the removable coupling 155 are removably engagable from the power element 85 via the first 150, second 175, and fourth 225 removably engagable interfaces, such that the cutting head assembly 205 can be safely immersed into a cleaning solution separate from the power element 85, see FIGS. 7 and 8.

The following list is the preferred major components of construction which are listed for a single embodiment of the cutting apparatus 50, it is understood that equivalents for each of the following could be used for the present invention of the cutting apparatus 50;

For the circuitry 440 as shown in FIG. 11 and positioned in FIGS. 2 and 3, the motor 390 is a preferably a Permanent Magnet 12 volt 16 mm Body Diameter by 2.2 in long, box Speed Reducer motor with an integral speed reducing gearbox with an output speed of 300 rpm and a 3 mm diameter output shaft. The main on/off switch is combined with a potentiometer and is preferably a 500K ohm, 0.2 W Power Rating, Single Linear Taper Switch Carbon Potentiometer Model WH138. The normally open switch 445 is preferably an Amico Momentary Push Button Tactile Switch that is a 4 pin DIP PCB that is 12 mm×12 mm×8 mm in size, UNSPSC Code 39122216. The light 375 is preferably a 5 mm White LED part number RL5-W6018 with a preferred lens from VCC part number LM-C5-LP or CLB 300 xxx. The DC motor 390 speed control is preferably a 20 W rated, code 804, Level 1, from FUTURE KIT, part number FK 804-1, being in the form of a preassembled circuit board that utilizes PWM for speed control. For the power supply it is preferably a 12 Volt 1 Amp AC to DC driven from a standard wall plug from PHC Enterprise part number PHC SW-121BP with a 2.5 mm×5.5 mm center positive output plug.

For the pair of open cutting blades 230 they are preferably constructed of tool grade stainless steel material ID CPM S35 that have a Rockwell "C" scale hardness of 59-62. For the first pivotal connection 305 whose goal is to keep a correct compressive tension as between the blades 230, the construction is preferably from a stainless steel sexbolt utilizing a pair of tension washers and a pair of self-lubricating thrust washers that are preferably an OILITE 841 thrust washer with a 5.3 mm inside diameter and a 9 mm outside diameter by 1.6 mm thick. The fourth pivotal connection 410 preferably uses a bushing that is an OILITE part number FFM0306-06. For the bushing guide 130 it is preferably constructed of an OILITE part number AAM0609-12.

For the first 414 and second 432 ball bearings are preferably ⅛" by ¼" sealed drive rod bearings from Serve City part number 535010, and the swivel couple 405 is preferably a 4 mm by 3.174 mm from Amazon part number a14061600ux0118.

Looking at particular at FIGS. 2 and 12, plus FIGS. 1, 4 to 8, and 14, 15, for the cutting apparatus 50, wherein the power element 85 that generates the reciprocating arm 111 reciprocating movement 140 is further constructed of a curved power element 87 housing 89 along the longitudinal axis 105 that further includes an electrical drive motor 390 having a motor rotational axis 395 that has a swivel rotational couple 405 to a barrel cam drive element 401 with a means 425 for the reciprocating arm 111 to dynamically interface with the barrel cam drive element 401. Wherein the reciprocating arm 111 is slidably engaged 135 to the bushing guide 130 affixed to the second end portion 95, the slidable engagement 135 facilitates the reciprocating movement 140, wherein operationally the reciprocating movement 140 is created by a rotation of the electric drive motor 390 about the motor rotational axis 395 wherein the barrel cam drive element 401 and the means 425 for the reciprocating arm 111 to dynamically interface with the barrel cam drive element 401 converts the electrical motor 390 rotation into the reciprocating movement 140.

Again, looking at particular at FIGS. 2 and 12, plus FIGS. 1, 4 to 8, and 14, 15, for the cutting apparatus 50 the means 425 for the reciprocating arm 111 to dynamically interface with the barrel cam drive element 401 is preferably constructed of a third pin 431 perpendicularly disposed to the reciprocating movement 140 with the third pin 431 disposed therethrough the reciprocating arm 111 that includes a second ball bearing 432 disposed on each opposite end of the third pin 431, with each second ball bearing 432 disposed external to the reciprocating arm 111, see in particular FIG. 12, also FIG. 2—which shows FIG. 12 assembled. Wherein one second ball bearing 432 rides within a channel 402 in the barrel cam drive element 401 and one second ball bearing 432 rides against a reciprocating arm 111 anti rotation surface 91 disposed on the curved power element 87 housing 89, see in particular FIG. 12, also FIG. 2—which shows FIG. 12 assembled.

Looking at particular at FIGS. 3 and 13, plus FIGS. 1, 4 to 8, and 14, 15, for the cutting apparatus 50, wherein the power element 85 that generates the reciprocating arm 110 reciprocating movement 140 is further constructed of a straight power element housing 88 along the longitudinal axis 105 that further includes an electrical drive motor 390 having a motor rotational axis 395 that is rotationally coupled to a cam drive element 400 with a means 415 for the reciprocating arm 110 to dynamically interface with the cam drive element 400. Wherein the reciprocating arm 110 is slidably engaged 135 to a bushing guide 130 affixed to the second end portion 95, the slidable engagement 135 facilitates the reciprocating movement 140, further a means 410 for anti rotation of the reciprocating arm 110 about the motor rotational axis 395 that is created by the electric motor 390 rotation about the motor rotation axis 395. Wherein operationally the reciprocating movement 140 is created by a rotation of the electric drive motor 390 wherein the cam drive element 400 and the means 415 for the reciprocating arm 110 to dynamically interface with the cam drive element 400 that converts the electrical motor 390 rotation into the reciprocating movement 140.

Again, looking at particular at FIGS. 2 and 12, plus FIGS. 1, 4 to 8, and 14, 15, for the cutting apparatus 50, wherein the means 415 for the reciprocating arm 110 to dynamically interface with the cam drive element 400 is constructed of a second pin 416 perpendicularly disposed to the reciprocating movement 140 with the second pin 416 disposed therethrough the reciprocating arm 110 that includes a first ball bearing 414 disposed on the second pin 416 and the first ball bearing 414 also disposed external to the reciprocating arm 110, see in particular FIG. 13, also FIG. 3—which shows FIG. 13 assembled. Wherein the first ball bearing 414 rides within a channel 403 in the cam drive element 400 and the means 410 for anti rotation of the reciprocating arm 110 about the motor rotational axis 395 that is created by the electric motor 390 rotation about the motor rotational axis 395 is constructed of a first pin 413 perpendicularly disposed to the reciprocating movement 140 with the first pin 413 disposed therethrough the reciprocating arm 110 that includes a first ball bearing 414 disposed on each opposite end of the first pin 413, with each first ball bearing 414 disposed external to the reciprocating arm 110, wherein the pair of first ball bearings 414 each ride within a receiving slot 411 that are disposed within the straight power element 86 housing 88 being oppositely positioned from one another, again see in particular FIG. 13, also FIG. 3—which shows FIG. 13 assembled.

CONCLUSION

Accordingly, the present invention of a cutting apparatus has been described with some degree of particularity directed to the embodiments of the present invention. It should be appreciated, though; that the present invention is defined by the following claim construed in light of the prior art so modifications or changes may be made to the exemplary embodiments of the present invention without departing from the inventive concepts contained therein.

The invention claimed is:

1. A cutting apparatus for trimming a selected portion from an article, said cutting apparatus comprising:
 (a) a power element that includes a first end portion and an opposing second end portion with a longitudinal axis spanning therebetween, wherein said first end portion has a reciprocating arm having a reciprocating movement along said longitudinal axis and said second end portion is adapted to be grasped by a manual user's hand, said reciprocating arm extending in a cantilever section having a first removably engagable rotatable couple annulus that is about said longitudinal axis and said first end portion also having a first removably engagable interface structure, said reciprocating movement is created by a motor via being rotationally connected to a cam drive element utilizing a means for said reciprocating arm to dynamically interface with said cam drive element;
 (b) a removable coupling having a primary end portion and an opposing secondary end portion with a lengthwise axis spanning therebetween, said primary end portion having a removably engagable rotationally free about said longitudinal axis second interface that forms a removably engagable rotatable couple with said reciprocating arm cantilever section rotatable couple annulus and said secondary end portion having a first slotted pivotal aperture, wherein said removably engagable rotatable couple transmits reciprocating axial force along said lengthwise axis and said longitudinal axis, wherein positionally said lengthwise axis and said longitudinal axis are coincident to one another; and
 (c) a removable cutting head assembly having a proximal end portion and an opposing distal end portion with a long axis spanning therebetween, said proximal end portion includes a fourth removably engagable interface structure that removably engages with said first removably engagable structure such that said long axis and said longitudinal axis are coincident to one another, said distal end portion extends outward along said long axis into having a reciprocating cutting blade that has a plurality of transversely positioned reciprocating cutting teeth that are external to said distal end portion on a cantilever end portion, said reciprocating cutting blade on an end opposing said cutting teeth has a slidably engaged portion that is disposed within a rotatable retainer head, wherein said retainer head is rotatable about said long axis within said distal end portion as said retainer head has a rotatable couple third interface structure with said distal end portion, said reciprocating cutting blade also extends toward said proximal end portion further opposite of said cutting teeth for a sixth pivotal connection having a sixth pivotal axis to said first slotted pivotal aperture of said removable coupling that is slidably engaged through a loop structure to said proximal end portion to maintain said reciprocating movement, further included is a static cutting blade that is retained in a cap that is rotatably removably engaged to said rotatable retainer head via a "U" shaped removably engagable pin that is received into a pair of mating channels that are disposed between said rotatable retainer head and said cap, said pin facilitates ninety degree rotational locks about said long axis as between said rotatable retainer head and said cap, said rotatable retainer head is slidably in contact with said reciprocating cutting blade, said static cutting blade also has a plurality of transversely positioned static cutting teeth that are in slidable contact with said reciprocating cutting teeth forming a hedge trimmer type arrangement, said reciprocating cutting teeth and said static cutting teeth have movement in a second plane, wherein operationally said reciprocating arm drives through said coupling to said reciprocating cutting blade such that with said static cutting blade has said hedge trimmer type movement that is functional to cut the article, further said rotatable retainer head is selectably rotatable as is said cap, wherein said sixth pivotal axis rotates in a circular movement about said longitudinal axis allowing said hedge trimmer type movement in said second plane to be selectively rotatable about said longitudinal axis, resulting in said second cutting plane having rotational adjustment relative to said manual grasp by the user's hand, further said cutting head assembly and said removable coupling are removably engagable from said power element via said first, second, and fourth removably engagable interfaces, such that said cutting head assembly can be safely immersed into a cleaning solution separate from said power element.

2. A cutting apparatus for trimming a selected portion from an article according to claim 1 wherein said coupling removably engagable rotationally free about said longitudinal axis second interface is constructed of a T-slot positioned perpendicular to said lengthwise axis with a single outward radially oriented opening, wherein said T-slot slidably engages said reciprocating arm annulus.

3. A cutting apparatus for trimming a selected portion from an article according to claim 2 further comprising a means for selectably rotationally locking said circular movement in a plurality of angular positions.

4. A cutting apparatus for trimming a selected portion from an article according to claim 3 wherein said means for selectably rotationally locking said circular movement in a plurality of angular positions is constructed of a flexible extension that projects in a cantilever manner away from said rotatable retainer head in an outward direction from said third interface structure and in a direction opposite that of said cap relation to said third interface structure, said flexible extension terminates in a protrusion that frictionally projects therethrough a second aperture disposed in said distal end portion.

5. A cutting apparatus for trimming a selected portion from an article according to claim 4 wherein said protrusion and said second aperture further comprise a clamp to help secure said protrusion and said second aperture to one another to further facilitate said selectable rotational locking of said circular movement in a plurality of angular positions.

6. A cutting apparatus for trimming a selected portion from an article according to claim 5 wherein said power element that generates said reciprocating arm reciprocating movement is further constructed of a curved power element housing along said longitudinal axis that further includes an electrical drive motor having a motor rotational axis that has a swivel rotational couple to a barrel cam drive element with a means for said reciprocating arm to dynamically interface with said barrel cam drive element, wherein said reciprocating arm is slidably engaged to a bushing guide affixed to said second end portion, said slidable engagement facilitates said reciprocating movement, wherein operationally said reciprocating movement is created by a rotation of said electric drive motor wherein said barrel cam drive element and said means for said reciprocating arm to dynamically interface with said barrel cam drive element converts said electrical motor rotation into said reciprocating movement.

7. A cutting apparatus for trimming a selected portion from an article according to claim 6 wherein said means for said reciprocating arm to dynamically interface with said barrel cam drive element is constructed of a third pin perpendicularly disposed to said reciprocating movement with said third pin disposed therethrough said reciprocating arm that includes a second ball bearing disposed on each opposite end of said third pin, with each said second ball bearing disposed external to said reciprocating arm, wherein one second ball bearing rides within a channel in said barrel cam drive element and one second ball bearing rides against a reciprocating arm anti rotation surface disposed on said curved power element housing.

8. A cutting apparatus for trimming a selected portion from an article according to claim 5 wherein said power element that generates said reciprocating arm reciprocating movement is further constructed of a straight power element housing along said longitudinal axis that further includes an electrical drive motor having a motor rotational axis that is rotational coupled to a cam drive element with a means for said reciprocating arm to dynamically interface with said cam drive element, wherein said reciprocating arm is slidably engaged to a bushing guide affixed to said second end portion, said slidable engagement facilitates said reciprocating movement, further a means for anti rotation of said reciprocating arm about said motor rotational axis that is created by said electric motor rotation, wherein operationally said reciprocating movement is created by a rotation of said electric drive motor wherein said cam drive element and said means for said reciprocating arm to dynamically interface with said cam drive element that converts said electrical motor rotation into said reciprocating movement.

9. A cutting apparatus for trimming a selected portion from an article according to claim 8 wherein said means for said reciprocating arm to dynamically interface with said cam drive element is constructed of a second pin perpendicularly disposed to said reciprocating movement with said second pin disposed therethrough said reciprocating arm that includes a first ball bearing disposed on said second pin and said first ball bearing also disposed external to said reciprocating arm, wherein said first ball bearing rides within a channel in said cam drive element and said means for anti rotation of said reciprocating arm about said motor rotational axis that is created by said electric motor rotation is constructed of a first pin perpendicularly disposed to said reciprocating movement with said first pin disposed therethrough said reciprocating arm that includes a first ball bearing disposed on each opposite end of said first pin, with each said first ball bearing disposed external to said reciprocating arm, wherein said pair of first ball bearings each ride within a receiving slot that are disposed within said straight power element housing being oppositely positioned from one another.

\* \* \* \* \*